United States Patent
Ajax et al.

(10) Patent No.: US 10,866,003 B2
(45) Date of Patent: Dec. 15, 2020

(54) THERMOSTAT WITH PREEMPTIVE HEATING, COOLING, AND VENTILATION IN RESPONSE TO ELEVATED OCCUPANCY DETECTION VIA PROXY

(71) Applicant: Johnson Controls Technology Company, Auburn Hills, MI (US)

(72) Inventors: Michael J. Ajax, Milwaukee, WI (US); Joseph R. Ribbich, Waukesha, WI (US); Nicholas S. Van Derven, Wauwatosa, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 95 days.

(21) Appl. No.: 15/953,228

(22) Filed: Apr. 13, 2018

(65) Prior Publication Data

US 2018/0299153 A1 Oct. 18, 2018

Related U.S. Application Data

(60) Provisional application No. 62/485,785, filed on Apr. 14, 2017.

(51) Int. Cl.
*F24F 11/30* (2018.01)
*F24F 11/00* (2018.01)
(Continued)

(52) U.S. Cl.
CPC .......... *F24F 11/30* (2018.01); *F24F 11/0001* (2013.01); *F24F 11/523* (2018.01);
(Continued)

(58) Field of Classification Search
CPC ...... F24F 11/0001; F24F 11/30; F24F 11/523; F24F 11/56; F24F 11/80;
(Continued)

(56) References Cited

U.S. PATENT DOCUMENTS

| 5,082,173 A | 1/1992 | Poehlman et al. |
| 5,119,987 A | 6/1992 | Kobayashi |

(Continued)

FOREIGN PATENT DOCUMENTS

| RU | 2141081 | 11/1999 |
| WO | WO 2017/031688 | 3/2012 |
| WO | WO 2012/047938 A2 | 4/2012 |

OTHER PUBLICATIONS

Search Report for International Application No. PCT/US2018/027635, dated Aug. 9, 2018, 8 pages.

*Primary Examiner* — Chun Cao
(74) *Attorney, Agent, or Firm* — Foley & Lardner LLP

(57) ABSTRACT

A controller for controlling a temperature of a building space includes an occupancy sensor configured to measure an occupancy signal indicating whether one or more occupants are within the building space and a processing circuit configured to receive the occupancy signal from the occupancy sensor. The processing circuit is configured to determine whether the number of occupants within the building space has increased by a predefined amount based on the received occupancy signal, decrease a value of a temperature setpoint for the building space from a first value to a second value in response to a determination that the number of occupants within the building space has increased by the predefined amount based on the received occupancy signal, and reduce the temperature of the building space by controlling one or more pieces of building equipment associated with the building space.

20 Claims, 9 Drawing Sheets

(51) Int. Cl.
| | |
|---|---|
| *F24F 11/56* | (2018.01) |
| *F24F 11/523* | (2018.01) |
| *G05B 13/02* | (2006.01) |
| *F24F 11/80* | (2018.01) |
| *G05B 15/02* | (2006.01) |
| *F24F 110/10* | (2018.01) |
| *F24F 120/12* | (2018.01) |
| *F24F 140/60* | (2018.01) |
| *F24F 120/10* | (2018.01) |

(52) U.S. Cl.
CPC .............. *F24F 11/56* (2018.01); *F24F 11/80* (2018.01); *G05B 13/021* (2013.01); *G05B 15/02* (2013.01); *F24F 2011/0002* (2013.01); *F24F 2110/10* (2018.01); *F24F 2120/10* (2018.01); *F24F 2120/12* (2018.01); *F24F 2140/60* (2018.01); *G05B 2219/2642* (2013.01)

(58) Field of Classification Search
CPC ........... F24F 2011/0002; F24F 2120/12; F24F 2110/10; F24F 2120/10; F24F 2140/60; G05B 13/021; G05B 15/02; G05B 2219/2642
See application file for complete search history.

(56) References Cited

U.S. PATENT DOCUMENTS

| | | | |
|---|---|---|---|
| 5,232,152 A | 8/1993 | Tsang | |
| 5,364,026 A | 11/1994 | Kundert | |
| 5,433,377 A | 7/1995 | Sodo et al. | |
| 5,482,210 A | 1/1996 | Carey et al. | |
| 5,547,107 A | 8/1996 | Boiardi | |
| 5,553,006 A | 9/1996 | Benda | |
| 5,902,183 A | 5/1999 | D'Souza | |
| 5,976,010 A | 11/1999 | Reese et al. | |
| 6,119,680 A | 9/2000 | Barritt | |
| 6,161,764 A | 12/2000 | Jatnieks | |
| 6,318,639 B1 | 11/2001 | Toth | |
| 6,369,716 B1 | 4/2002 | Abbas et al. | |
| 6,398,118 B1 | 6/2002 | Rosen et al. | |
| 6,431,268 B1 | 8/2002 | Rudd | |
| 6,432,721 B1 | 8/2002 | Zook et al. | |
| 6,456,943 B1 | 9/2002 | Kogure et al. | |
| 6,467,695 B1 | 10/2002 | Riley et al. | |
| 6,484,951 B1 | 11/2002 | Mueller | |
| 6,514,138 B2 | 2/2003 | Estepp | |
| 6,578,770 B1 | 6/2003 | Rosen | |
| 6,629,886 B1 | 10/2003 | Estepp | |
| 6,698,219 B2 | 3/2004 | Sekhar et al. | |
| 6,919,809 B2 | 7/2005 | Blunn et al. | |
| 6,920,874 B1 | 7/2005 | Siegel | |
| 6,935,570 B2 | 8/2005 | Acker, Jr. | |
| 6,941,193 B2 | 9/2005 | Frecska et al. | |
| 6,988,671 B2 | 1/2006 | DeLuca | |
| 7,044,397 B2 | 5/2006 | Bartlett et al. | |
| 7,109,853 B1 | 9/2006 | Mattson et al. | |
| 7,113,086 B2 | 9/2006 | Shorrock | |
| 7,222,494 B2 | 5/2007 | Peterson et al. | |
| 7,226,496 B2 | 6/2007 | Ehlers | |
| 7,284,382 B2 | 10/2007 | Wong | |
| 7,325,748 B2 | 2/2008 | Acker, Jr. | |
| 7,434,413 B2 | 10/2008 | Wruck | |
| 7,758,407 B2 | 7/2010 | Ahmed | |
| 7,758,408 B2 | 7/2010 | Hagentoft | |
| 7,788,936 B2 | 9/2010 | Peterson et al. | |
| 7,793,510 B2 | 9/2010 | Perry et al. | |
| 7,798,418 B1 | 9/2010 | Rudd | |
| 7,918,407 B2 | 4/2011 | Patch | |
| 8,066,558 B2 | 11/2011 | Thomle et al. | |
| 8,091,796 B2 | 1/2012 | Amundson et al. | |
| 8,100,746 B2 | 1/2012 | Heidel et al. | |
| 8,141,373 B2 | 3/2012 | Peterson et al. | |
| 8,165,721 B2 | 4/2012 | Petit | |
| 8,185,244 B2 | 5/2012 | Wolfson | |
| 8,190,367 B2 | 5/2012 | Bassa | |
| 8,214,085 B2 | 7/2012 | Boudreau et al. | |
| 8,219,249 B2 | 7/2012 | Harrod et al. | |
| 8,423,192 B2 | 4/2013 | Liu | |
| 8,463,344 B2 | 6/2013 | Williams | |
| 8,511,578 B2 | 8/2013 | Has | |
| 8,515,584 B2 | 8/2013 | Miller et al. | |
| 8,543,244 B2 | 9/2013 | Keeling et al. | |
| 8,555,662 B2 | 10/2013 | Peterson et al. | |
| 8,640,970 B2 | 2/2014 | Dorendorf | |
| 8,651,391 B2 | 2/2014 | Patch | |
| 8,665,097 B2 | 3/2014 | Worthington et al. | |
| 8,694,164 B2 | 4/2014 | Grohman et al. | |
| 8,768,521 B2 | 7/2014 | Amundson et al. | |
| 8,874,497 B2 | 10/2014 | Raestik et al. | |
| 8,924,026 B2 | 12/2014 | Federspiel et al. | |
| 8,939,827 B2 | 1/2015 | Boudreau et al. | |
| 8,965,586 B2 | 2/2015 | Miller et al. | |
| 8,972,063 B2* | 3/2015 | Kobayashi | F24F 11/30 700/276 |
| 9,043,034 B2 | 5/2015 | Miller et al. | |
| 9,056,539 B2 | 6/2015 | Mirza et al. | |
| 9,182,751 B1 | 11/2015 | Reeder | |
| 9,291,358 B2 | 3/2016 | Federspiel et al. | |
| 9,328,936 B2 | 5/2016 | Meirav et al. | |
| 9,435,557 B2 | 9/2016 | Albrecht et al. | |
| 9,471,069 B2 | 10/2016 | Amundson et al. | |
| 9,494,337 B2 | 11/2016 | Ragg | |
| 9,506,665 B2 | 11/2016 | Dorendorf et al. | |
| 9,506,668 B2 | 11/2016 | Sinur et al. | |
| 9,581,575 B2 | 2/2017 | Batayneh et al. | |
| 9,594,384 B2 | 3/2017 | Bergman et al. | |
| 9,618,224 B2 | 4/2017 | Emmons et al. | |
| 9,671,125 B2 | 6/2017 | Mowris et al. | |
| 9,677,772 B2 | 6/2017 | Siegel et al. | |
| 9,696,052 B2 | 7/2017 | Malchiondo et al. | |
| 9,810,441 B2 | 11/2017 | Dean-Hendricks et al. | |
| 2003/0160103 A1* | 8/2003 | Guo | G05D 23/1917 236/47 |
| 2003/0181158 A1 | 9/2003 | Schell et al. | |
| 2005/0224069 A1 | 10/2005 | Patil et al. | |
| 2006/0004492 A1 | 1/2006 | Terlson et al. | |
| 2006/0213000 A1 | 9/2006 | Kimble et al. | |
| 2007/0062513 A1 | 3/2007 | Gagas | |
| 2007/0264927 A1 | 11/2007 | Choi et al. | |
| 2008/0011863 A1 | 1/2008 | Roux et al. | |
| 2008/0102744 A1 | 5/2008 | Moore et al. | |
| 2009/0001179 A1 | 1/2009 | Dempsey | |
| 2009/0143915 A1 | 6/2009 | Dougan et al. | |
| 2010/0107076 A1 | 4/2010 | Grohman et al. | |
| 2011/0007017 A1 | 1/2011 | Wallaert | |
| 2011/0010652 A1 | 1/2011 | Wallaert | |
| 2011/0010653 A1 | 1/2011 | Wallaert et al. | |
| 2011/0223850 A1 | 9/2011 | Narayanamurthy et al. | |
| 2012/0015594 A1 | 1/2012 | Yenneti et al. | |
| 2012/0023428 A1 | 1/2012 | Kennard et al. | |
| 2012/0066168 A1* | 3/2012 | Fadell | G05B 15/02 706/52 |
| 2012/0186774 A1 | 7/2012 | Matsuoka et al. | |
| 2012/0190294 A1 | 7/2012 | Heidel et al. | |
| 2012/0245740 A1 | 9/2012 | Raestik et al. | |
| 2012/0252345 A1 | 10/2012 | Wolfson | |
| 2013/0008224 A1 | 1/2013 | Stormbom | |
| 2013/0040550 A1 | 2/2013 | Pfister et al. | |
| 2013/0085609 A1* | 4/2013 | Barker | G05B 15/02 700/276 |
| 2013/0226352 A1 | 8/2013 | Dean-Hendricks et al. | |
| 2014/0051632 A1 | 2/2014 | Jaworowicz | |
| 2014/0099872 A1 | 4/2014 | Matsumoto et al. | |
| 2014/0130574 A1 | 5/2014 | Happ et al. | |
| 2014/0188287 A1 | 7/2014 | Sabata | |
| 2014/0202449 A1 | 7/2014 | Snyder | |
| 2014/0222220 A1* | 8/2014 | Fadell | F24F 11/30 700/278 |
| 2015/0148963 A1 | 5/2015 | Klein et al. | |
| 2015/0153061 A1 | 6/2015 | Riberon et al. | |
| 2015/0176855 A1* | 6/2015 | Geadelmann | F24F 11/30 165/237 |

(56) References Cited

U.S. PATENT DOCUMENTS

| | | |
|---|---|---|
| 2015/0299063 A1 | 10/2015 | Iwai et al. |
| 2015/0345819 A1 | 12/2015 | Ostrovsky et al. |
| 2015/0369503 A1 | 12/2015 | Flaherty et al. |
| 2015/0369507 A1 | 12/2015 | Flaherty et al. |
| 2016/0040902 A1 | 2/2016 | Shah |
| 2016/0069580 A1 | 3/2016 | Crisa |
| 2016/0116177 A1 | 4/2016 | Sikora et al. |
| 2016/0116512 A1 | 4/2016 | Ji et al. |
| 2016/0178589 A1 | 6/2016 | Gulaguli et al. |
| 2016/0223503 A1 | 8/2016 | Abehassera et al. |
| 2016/0231014 A1 | 8/2016 | Ro et al. |
| 2016/0261932 A1* | 9/2016 | Fadell ................ H04Q 9/00 |
| 2016/0327921 A1* | 11/2016 | Ribbich ............... F24F 11/30 |
| 2016/0327966 A1 | 11/2016 | Bergman et al. |
| 2016/0377298 A1 | 12/2016 | Livchak et al. |
| 2017/0052545 A1 | 2/2017 | Cortez |
| 2017/0067239 A1 | 3/2017 | Dorendorf et al. |
| 2017/0074539 A1* | 3/2017 | Bentz ................ H04W 4/80 |
| 2017/0074541 A1 | 3/2017 | Bentz et al. |
| 2017/0130981 A1 | 5/2017 | Willette et al. |
| 2017/0136206 A1 | 5/2017 | Pillai et al. |
| 2017/0139386 A1 | 5/2017 | Pillai et al. |
| 2017/0159954 A1 | 6/2017 | Bergman et al. |
| 2017/0176030 A1 | 6/2017 | Emmons et al. |
| 2017/0248564 A1 | 8/2017 | Miyajima |
| 2017/0307243 A1* | 10/2017 | Burt ................ G05B 19/048 |

* cited by examiner

THERMOSTAT WITH PREEMPTIVE HEATING, COOLING, AND VENTILATION IN RESPONSE TO ELEVATED OCCUPANCY DETECTION VIA PROXY

CROSS-REFERENCE TO RELATED PATENT APPLICATION

This application claims the benefit of and priority to U.S. Provisional Patent Application No. 62/485,785 filed Apr. 14, 2017, the entire disclosure of which is incorporated by reference herein.

BACKGROUND

The present disclosure relates generally to thermostats and more particularly to the improved control of a building or space's heating, ventilating, and air conditioning (HVAC) system through the use of a multi-function, multi-touch, thermostat.

A thermostat is, in general, a component of an HVAC control system. Traditional thermostats sense the temperature of a system and control components of the HVAC in order to maintain a setpoint. A thermostat may be designed to control a heating or cooling system or an air conditioner. Thermostats are manufactured in many ways and use a variety of sensors to measure temperature and other desired parameters of a system.

Conventional thermostats are configured for one-way communication to connected components, and to control HVAC systems by turning on or off certain components. Each thermostat may include a temperature sensor and a user interface. The user interface typically includes display for presenting information to a user and one or more user interface elements for receiving input from a user. To control the temperature of a building or space, a user adjusts the setpoint via the thermostat's user interface.

SUMMARY

One implementation of the present disclosure is a controller for controlling a temperature of a building space. The controller includes occupancy sensor configured to measure an occupancy signal indicating whether one or more occupants are within the building space. The processing circuit is configured to receive the occupancy signal from the occupancy sensor, determine whether the number of occupants within the building space has increased by a predefined amount based on the received occupancy signal, decrease a value of a temperature setpoint for the building space from a first value to a second value in response to a determination that the number of occupants within the building space has increased by the predefined amount based on the received occupancy signal, and reduce the temperature of the building space by controlling one or more pieces of building equipment associated with the building space based on the second value of the temperature setpoint in response to the determination that the number of occupants within the building space has increased by the predefined amount.

In some embodiments, the controller includes a temperature sensor configured to measure a temperature value associated with the building space, where the occupancy signal changes at a rate faster than the temperature value changes at in response to the number of occupants within the building space changing by the predefined amount. In some embodiments, the processing circuit is configured to reduce the temperature of the building space by controlling the one or more pieces of building equipment associated with the building space based on the second value of the temperature setpoint and the temperature value in response to the determination that the number of occupants within the building space has increased by the predefined amount.

In some embodiments, the occupancy sensor is at least one of a gas sensor configured to measure an occupant generated gas concentration level within the building space, a camera configured to record one or more camera signals associated with the building space, and a microphone configured to generate audio signals of the building space.

In some embodiments, the processing circuit is configured to control a ventilator associated with the building space to increase a level of ventilation of the building space in response to the determination that the number of occupants within the building space has increased by the predefined amount based on the received occupancy signal.

In some embodiments, the occupancy sensor is a camera configured to capture a camera signal associated with the building space. In some embodiments, the processing circuit is configured to receive the camera signal from the camera and determine whether the number of occupants within the building space has increased by the predefined amount by identifying a number of occupants within the building space based on the camera signal and comparing the identified number of occupants within the building space in the camera signal to a baseline occupancy level.

In some embodiments, the occupancy sensor is a microphone configured to generate an audio signal indicative of sounds generated by the occupants within the building space. In some embodiments, the processing circuit is configured to receive the audio signal from the microphone and determine whether the number of occupants within the building space has increased by the predefined amount by identifying a number of occupants within the building space based on the audio signal and comparing the identified number of occupants in the image to a baseline occupancy level.

In some embodiments, the occupancy sensor is a gas sensor configured to measure an occupant generated gas concentration level within the building space. In some embodiments, the processing circuit is configured to receive the occupant generated gas concentration level from the gas sensor and determine whether the number of occupants within the building space has increased by the predefined amount based on the received occupant generated gas concentration level.

In some embodiments, the concentration level of the occupant generated gas is at least one of a carbon dioxide ($CO_2$) concentration level, a volatile organic compound (VOC) concentration level, and a nitrogen dioxide ($NO_2$) concentration level.

In some embodiments, the processing circuit is configured to determine whether the number of occupants within the building space has increased by the predefined amount based on the received occupant generated gas concentration level by determining a rate at which the occupant generated gas concentration level is increasing based on the received occupant generated gas concentration level and one or more other occupant generated gas concentration levels and determining that the number of the occupants within the building space has increased by the predefined amount in response to determining that the rate is greater than a predefined rate.

In some embodiments, the processing circuit is configured to determine a baseline levels based on additional occupant generated gas concentration levels and store the baseline levels in a memory device, each of the baseline levels being associated with a particular time interval and determine whether the number of occupants within the building space has increased by the predefined amount by retrieving one of the baseline levels from the memory device based on a time at which the occupant generated gas concentration level is received from the gas sensor and determine whether the number of occupants within the building space has increased by the predefined amount by comparing the received occupant generated gas concentration level to the retrieved one of the baseline levels.

In some embodiments, the processing circuit is configured to generate the baseline level based on the additional occupant generated gas concentration levels by performing a weighted average of the additional occupant generated gas concentration levels.

In some embodiments, the processing circuit is configured to determine whether the number of occupants within the building space has increased by the predefined amount based on the received occupant generated gas concentration level by comparing the occupant generated gas concentration level with a baseline.

In some embodiments, the processing circuit is configured to receive additional occupant generated gas concentration levels from the gas sensor, each of the additional occupant generated gas concentration levels indicating a particular gas concentration level at a particular time of times and generate the baseline based on the additional occupant generated gas concentration levels.

Another implementation of the present disclosure is a method for controlling a temperature of a building space. The method includes receiving, by a processing circuit, an occupancy signal from an occupancy sensor, determining, by the processing circuit, whether a number of occupants within the building space has increased by a predefined amount based on the received occupancy signal, decreasing, by the processing circuit, a value of a temperature setpoint for the building space from a first value to a second value in response to a determination that the number of occupants within the building space has increased by the predefined amount based on the received occupancy signal, and reducing, by the processing circuit, the temperature of the building space by controlling one or more pieces of building equipment associated with the building space based on the second value of the temperature setpoint in response to determining that the number of occupants within the building space has increased by the predefined amount.

In some embodiments, the occupancy sensor is at least one of a gas sensor configured to measure an occupant generated gas concentration within the building space, a camera configured to record one or more camera signals associated with the building space, and a microphone configured to generate audio signals of the building space.

In some embodiments, the method further includes controlling, by the processing circuit, a ventilator associated with the building space to increase a level of ventilation of the building space in response to the determination that the number of occupants within the building space has increased by the predefined amount based on the occupancy signal.

In some embodiments, the occupancy sensor is a gas sensor configured to measure an occupant generated gas concentration level within the building space. In some embodiments, the method includes receiving, by the processing circuit, the occupant generated gas concentration level from the gas sensor and determining, by the processing circuit, whether the number of occupants within the building space has increased by the predefined amount based on the received occupant generated gas concentration.

In some embodiments, determining whether the number of occupants within the building space has increased by the predefined amount based on the received occupant generated gas concentration level includes determining the rate at which the occupant generated gas concentration level is increasing based on the received occupant generated gas concentration level and one or more other occupant generated gas concentration levels and determining that the number of the occupants within the building space has increased in response to determining that the rate is greater than a predefined rate.

Another implementation of the present disclosure is a building control system for controlling a temperature of a building space. The system includes a gas sensor configured to measure an occupant generated gas concentration level within the building space. The system includes a processing circuit configured to receive the occupant generated gas concentration level from the gas sensor, determine whether the number of occupants within the building space has increased by a predefined amount based on the received occupant generated gas concentration level, decrease a value of a temperature setpoint for the building space from a first value to a second value in response to a determination that the number of occupants within the building space has increased by the predefined amount based on the received occupancy signal, and reduce the temperature of the building space by controlling one or more pieces of building equipment associated with the building space based the second value of the temperature setpoint in response to the determination that the number of occupants within the building space has increased by the predefined amount.

In some embodiments, the processing circuit is configured to determine whether the number of occupants within the building space has increased based on the received occupant generated gas concentration level by determining a rate at which the occupant generated gas concentration level is increasing based on the received occupant generated gas concentration level and one or more other occupant generated gas concentration levels and determining that the number of the occupants within the building space has increased in response to determining that the rate is greater than a predefined rate.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
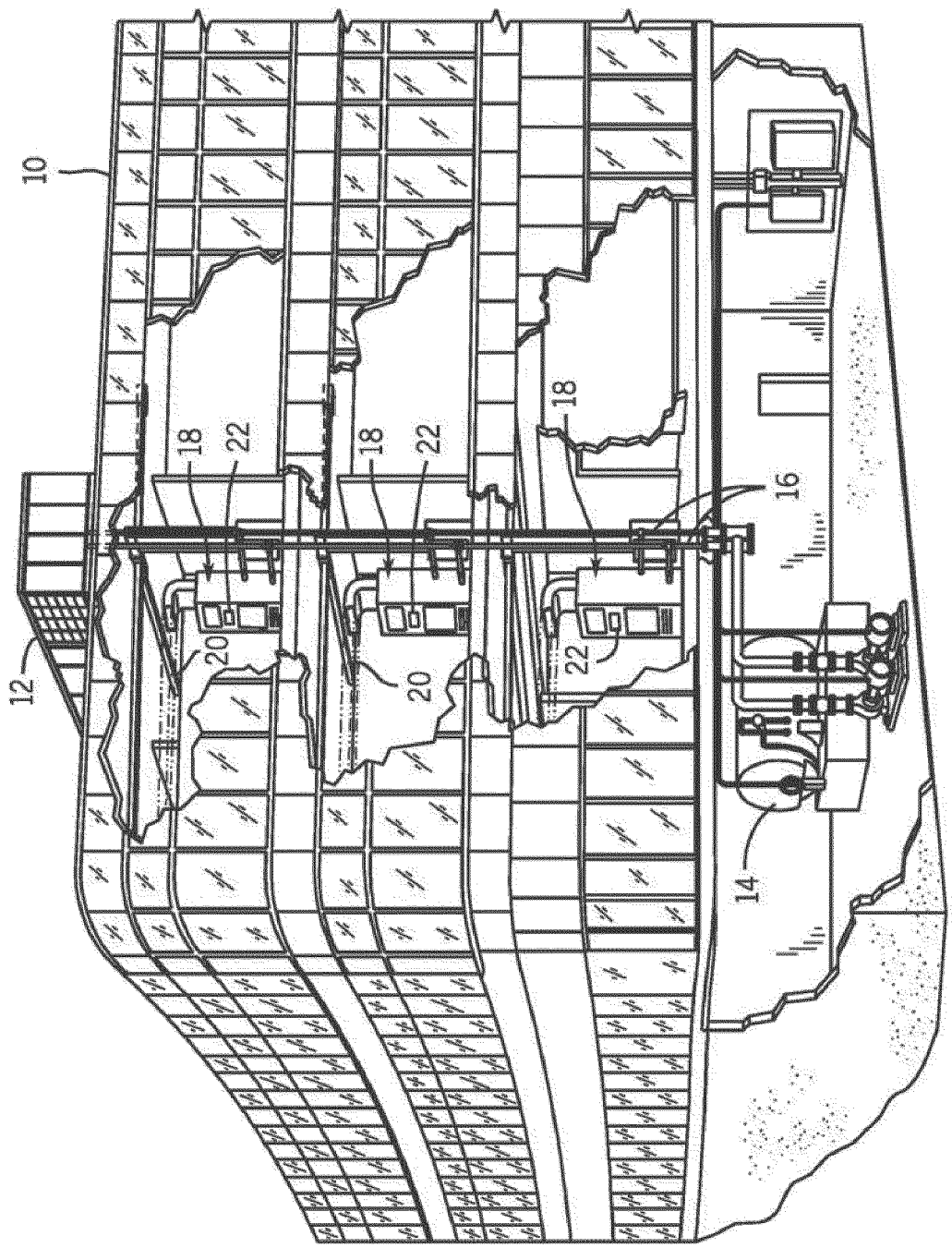
FIG. 1 is an illustration of a commercial or industrial HVAC system that employs heat exchangers, according to an example embodiment.

Referring generally to the FIGURES, a thermostat including occupancy detection logic is shown, according to various example embodiments. The thermostat described herein may be used in any HVAC system, room, environment, or system within which it is desired to control and/or observe environmental conditions (e.g., temperature, humidity, etc.).

The thermostat described herein is intended to improve the methodologies through which traditional thermostats detect occupancy in a building space. Some thermostats may include a passive infrared system to determine whether any occupants are present. In some cases, if a building space containing multiple rooms only includes a single thermostat and an occupant is in a room other than the one of the thermostat, the traditional system may provide a false indication of zero occupancy. Additionally, such sensors may only indicate if any occupants are present; they do not provide any indications as to how many occupants are in a building space. Such information may be crucial for proper operation of an HVAC system. Occupants emit heat. As such, when a number of occupants suddenly enter into a building space, the temperature in the building space begins to rise. Any response by the HVAC system may be delayed, as it will take time for a temperature sensor associated with the thermostat to sense the temperature increase. Further, due to the continuous emission of heat by the occupants, the amount of warm or cool air that the HVAC system must supply to the building space to maintain temperature at a setpoint changes. Thus, traditional thermostats fail to operate optimally during times of heightened occupancy.

The thermostat disclosed herein can be configured to solve such shortcomings by utilizing a proxy to determine the level of occupancy in a building space. For example, the thermostat disclosed herein may detect the concentration level of a human-generated gas (e.g., carbon dioxide) using a gas sensor. Fresh air has about 0.04% concentration by volume of carbon dioxide and around a 20.9% concentration by volume of oxygen. The air that a human exhales, in contrast, is about 4-5.5% concentration by volume of carbon dioxide and about 13.5-16% concentration by volume of oxygen. Thus, as the number of occupants in the building space increases, the concentration percentage of carbon dioxide will trend towards the latter concentration. In other words, the concentration of carbon dioxide in the building space is proportional to the occupancy of the building space. The thermostat disclosed herein can be configured to determine a number of baseline carbon dioxide concentration levels, readings generated by the gas sensor are then compared to the baselines to determine an occupancy level in the building space. In response to a heightened level of occupancy being detected, the thermostat disclosed herein can be configured to adjust the setpoints used to control the HVAC system. A heightened level of occupancy may be an increased level of occupancy, e.g., a increase in occupancy by a predefined amount. For example, a particular number of occupants increasing by a predefined amount, an occupancy percentage increasing by a predefined amount, etc.

In some cases, a thermostat measures a temperature of a building via a temperature sensor. However, the rate of change of the measured temperature of the building may be lower than an actual change in temperature of the building for changes in occupancy. In this regard, if a large number of occupants enter a building, the temperature of the building might increase significantly, creating an uncomfortable environmental condition, before the thermostat would determine to decrease the temperature of the building based on the measured temperature.

However, various proxy indicators that are proportional and/or related to occupancy (e.g., audio signals of a microphone, occupant generated gas concentration levels of a gas sensor, camera signals of a camera, etc.) may change at a rate faster than the measured temperature in response to changes in occupancy. In this regard, if a thermostat operates based on the proxy indicator instead of only the measured temperature, the thermostat can preemptively control heating, cooling, and/or ventilation before the measured temperature changes or changes by a significant amount (e.g., an amount that causes a call for heating and/or cooling based on a setpoint). The preemptive control can be implemented by the thermostat by lowering a temperature setpoint and controlling building equipment with the lowered temperature setpoint and the sensed temperature.

Building with HVAC System and Thermostat

Figure 2A:
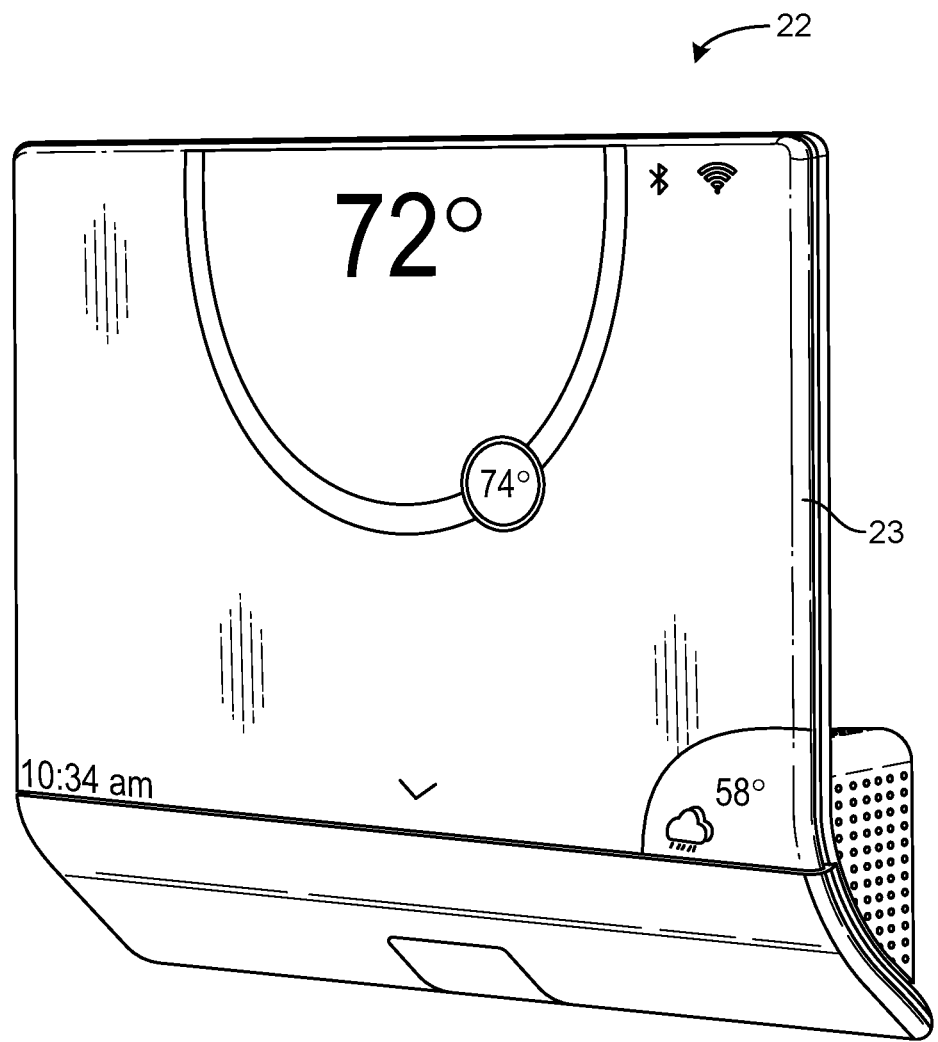
FIG. 2A is a drawing of a thermostat with a transparent cantilevered display, according to an exemplary embodiment.
Figure 2B:
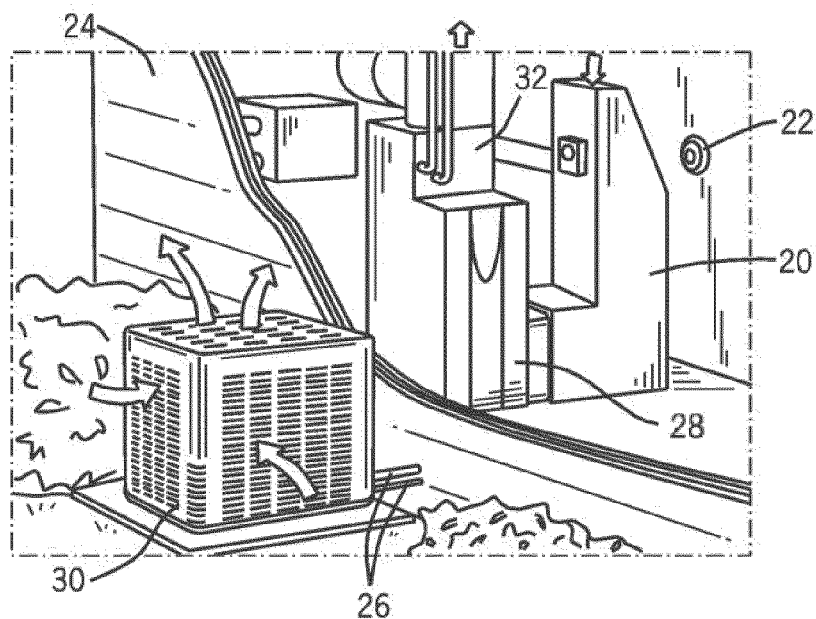
FIG. 2B is an illustration of a residential HVAC system that employs heat exchangers, according to an example embodiment.
Figure 3:
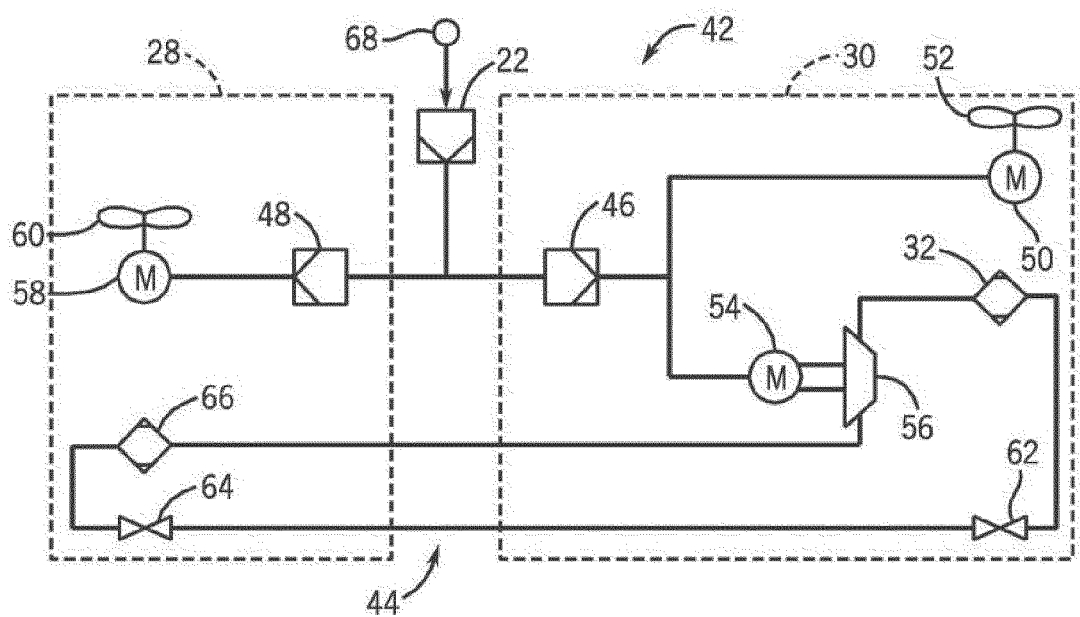
FIG. 3 is a block diagram of a HVAC system that employs the thermostat of FIG. 2B, according to an example embodiment.

FIGS. 1-3 illustrate an example environment, a building 10, in which the current invention may be used. Referring specifically to FIG. 1, a HVAC system for building environmental management is shown, according to an example embodiment. The HVAC system may be a communicating system employing one or more control devices (e.g., thermostats) functioning as system controllers. A building space 402 is cooled by a system that includes a chiller 12 and a boiler 14. As shown, chiller 12 is disposed on the roof of building space 402 and boiler 14 is located in the basement; however, the chiller and boiler may be located in other equipment spaces or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building space 402 by water conduits 16. Water conduits 16 are routed to air handlers 18, located on individual floors and within sections of building space 402.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building space 402, such as spaces, apartments, or offices, to maintain the environments at a designated temperature. A thermostat 22, shown here as including a thermostat, may be used to designate the temperature of the conditioned air. Thermostat 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

FIG. 2A is a drawing of the thermostat 22 of FIG. 1 shown to include a transparent cantilevered user interface 23, according to an exemplary embodiment. The user interface 23 may be an interactive display that can display information to a user and receive input from the user. The user interface 23 may be transparent such that a user can view information on the display and view the surface (e.g., a wall) located behind the display. Thermostats with transparent and cantilevered user interfaces are described in further detail in U.S. patent application Ser. No. 15/146,649 filed May 4, 2016, the entirety of which is incorporated by reference herein.

The user interface 23 can be a touchscreen or other type of electronic display configured to present information to a user in a visual format (e.g., as text, graphics, etc.) and receive input from a user (e.g., via a touch-sensitive panel). For example, the user interface 23 may include a touch-sensitive panel layered on top of an electronic visual display. A user can provide inputs through simple or multi-touch gestures by touching the user interface 23 with one or more fingers and/or with a stylus or pen. The user interface 23 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of user interface 23 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the user interface 202 is configured to present visual media (e.g., text, graphics, etc.) without requiring a backlight.

FIG. 2B illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 will include refrigerant conduits 26 that operatively couple an indoor unit 28 to an outdoor unit 30. Indoor unit 28 may be positioned in a utility space, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2B is operating as an air conditioner, a coil in outdoor unit 30 serves as a condenser for recondensing vaporized refrigerant flowing from indoor unit 28 to outdoor unit 30 via one of the refrigerant conduits 26. In these applications, a coil of the indoor unit, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan (not shown), and expels the air as indicated by the arrows above the outdoor unit. When operating as an air conditioner, the air is heated by the condenser coil within the outdoor unit and exits the top of the unit at a temperature higher than it entered the sides. Air is blown over indoor coil 32 and is then circulated through residence 24 by means of ductwork 20, as indicated by the arrows entering and exiting ductwork 20. The overall system operates to maintain a desired temperature as set by thermostat 22. When the temperature sensed inside the residence is higher than the set point on the thermostat (with the addition of a relatively small tolerance), the air conditioner will become operative to refrigerate additional air for circulation through the residence. When the temperature reaches the setpoint (with the removal of a relatively small tolerance), the unit will stop the refrigeration cycle temporarily.

When the unit in FIG. 2B operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 32 will receive a stream of air blown over it and will heat the air by condensing a refrigerant.

FIG. 3 is a block diagram of an HVAC system 42 that includes the thermostat 22, indoor unit 28 functioning as an air handler, and outdoor unit 30 functioning as a heat pump. Refrigerant flows through system 42 within a closed refrigeration loop 44 between outdoor unit 30 and indoor unit 28. The refrigerant may be any fluid that absorbs and extracts heat. For example, the refrigerant may be hydro fluorocarbon (HFC) based R-410A, R-407C, or R-134a.

The operation of indoor and outdoor units 28 and 30 is controlled by control circuits 48 and 46, respectively. The control circuits 46 and 48 may execute hardware or software control algorithms to regulate the HVAC system. In some embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications.

The control circuits 46 and 48 may receive control signals from thermostat 22 and transmit the signals to equipment located within indoor unit 28 and outdoor unit 30. For example, outdoor control circuit 46 may route control signals to a motor 50 that powers a fan 52 and to a motor 54 that powers a compressor 56. Indoor control circuit 48 may route control signals to a motor 58 that powers a fan 60. The control circuits also may transmit control signals to other types of equipment such as valves 62 and 64, sensors, and switches.

In some embodiments, thermostat 22 may communicate with control circuits 46 and 48 by transmitting communication packets over a serial communication interface. Thermostat 22 may function as the master system controller while control circuits 46 and 48 operate as slave devices. In certain embodiments, thermostat 22 may send a ping message to discover connected slave devices and their properties. For example, control circuits 46 and 48 may transmit an acknowledgement message in response to receiving a ping message from thermostat 22. Control circuits 46 and 48 also may transmit information, in response to requests from thermostat 22, identifying the type of unit and specific properties of the unit. For example, control circuit 46 may transmit a signal to thermostat 22 indicating that it controls a two-stage heat pump with auxiliary heat and a bonnet sensor. Control circuits 46 and 48 also may transmit signals identifying terminal connections and jumper settings of the control circuits.

Thermostat 22 may operate to control the overall heating and cooling provided by indoor and outdoor units 28 and 30. Indoor and outdoor units 28 and 30 include coils 66 and 32, respectively, that both operate as heat exchangers. The coils may function either as an evaporator or a condenser depending on the heat pump operation mode. For example, when heat pump system 42 is operating in cooling (or "AC") mode, outside coil 32 functions as a condenser, releasing heat to the outside air, while inside coil 66 functions as an evaporator, absorbing heat from the inside air. When heat pump system 42 is operating in heating mode, outside coil 32 functions as an evaporator, absorbing heat from the outside air, while inside coil 66 functions as a condenser, releasing heat to the inside air. A reversing valve may be positioned on closed loop 44 to control the direction of refrigerant flow and thereby to switch the heat pump between heating mode and cooling mode.

Heat pump system 42 also includes two metering devices 62 and 64 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when heat pump system 74 is operating in cooling mode, refrigerant bypasses metering device 62 and flows through metering device 64 before entering inside coil 66, which acts as an evaporator. In another example, when heat pump system 42 is operating in heating mode, refrigerant bypasses metering device 64 and flows through metering device 62 before entering outside coil 32, which acts as an evaporator. According to other example embodiments, a single metering device may be used for both heating mode and cooling mode. The metering devices typically are thermal or electronic expansion valves, but also may be orifices or capillary tubes.

The refrigerant enters the evaporator, which is outside coil 32 in heating mode and inside coil 66 in cooling mode, as a low temperature and pressure liquid. Some vapor refrigerant also may be present as a result of the expansion process that occurs in metering device 62 or 64. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 56. Compressor 56 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 56, the increased temperature and pressure vapor refrigerant flows into a condenser, the location of which is determined by the heat pump mode. In cooling mode, the refrigerant flows into outside coil 32 (acting as a condenser). Fan 52, which is powered by motor 50, draws air across the tubes containing refrigerant vapor. According to certain example embodiments, the fan may be replaced by a pump that draws fluid across the multichannel tubes. The heat from the refrigerant is transferred to the outside air causing the refrigerant to condense into a liquid. In heating mode, the refrigerant flows into inside coil 66 (acting as a condenser). Fan 60, which is powered by motor 58, draws air across the tubes containing refrigerant vapor. The heat from the refrigerant is transferred to the inside air causing the refrigerant to condense into a liquid.

After exiting the condenser, the refrigerant flows through the metering device (62 in heating mode and 64 in cooling mode) and returns to the evaporator (outside coil 32 in heating mode and inside coil 66 in cooling mode) where the process begins again.

In both heating and cooling modes, motor 54 drives compressor 56 and circulates refrigerant through reversible refrigeration/heating loop 44. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 54 is controlled by control circuit 46. Control circuit 46 may receive control signals from thermostat 22. In certain embodiments, thermostat 22 may receive information from sensors 68. One sensor 68 may measure the ambient indoor air temperature. Thermostat 22 then compares the air temperature to the temperature set point (which may be input by a user) and engages compressor motor 54 and fan motors 50 and 58 to run the cooling system if the air temperature is above the temperature set point. In heating mode, thermostat 22 compares the air temperature from sensor 68 to the temperature set point and engages motors 50, 54, and 58 to run the heating system if the air temperature is below the temperature set point.

Thermostat 22 may also receive information from another sensor 68 that measures various indicators of occupancy inside of a building. According to an example embodiment, the sensor 68 comprises a gas sensor capable of measuring the concentration level of a human-generated gas. The control device compares the concentration level to a baseline established by the methods disclosed herein to determine if the building has a heightened level of occupancy. If the concentration level indicates that there is a heightened level of occupancy in the building, the thermostat 22 may adjust the temperature setpoints against which the measurements from the temperature sensor 68 are compared to control the HVAC system 42. In an example embodiment, the thermostat 22 is configured to lower the setpoints by an adjustment amount. The adjustment amounts may depend on a variety of factors such as the setpoint prior to the heightened level of occupancy detected, an occupancy level estimation based on the measured concentration level, and weather conditions external to the building. In any event, assuming that the HVAC system 42 maintained the temperature inside the building at or near the previous setpoint, the lowering of the setpoints will cause the HVAC system 42 to begin cooling the building immediately in response to the heightened level of occupancy being detected. As a result, the thermostat 22 pre-emptively cools the building to counteract the effects of a heightened level of occupancy.

However, if the concentration level indicates that there is not a heightened level of occupancy, the control device may compare the air temperature as measured by the sensing device 68 to the setpoints to maintain the setpoints used to control the HVAC system 42.

The thermostat 22 may also control the ventilation to the building. For example, the thermostat 22 may control various actuators associated with various dampers in the outdoor unit 30 to control the rates at which inside air is expelled to the exterior of the building or outside air is directed to the interior of the building. Additionally, the thermostat 22 may control the ventilator or amount of air introduced into various zones (e.g., rooms) of the building by controlling various dampers associated with an air supply duct.

The control circuit 46 and thermostat 22 also may initiate a defrost cycle when the system is operating in heating mode. When the outdoor temperature approaches freezing, moisture in the outside air that is directed over outside coil 32 may condense and freeze on the coil. Sensors may be included within outdoor unit 30 to measure the outside air temperature and the temperature of outside coil 32. These sensors provide the temperature information to the control circuit 46 which determines when to initiate a defrost cycle.

Thermostat Control Based on Occupancy Detection by Proxy

Figure 4A:
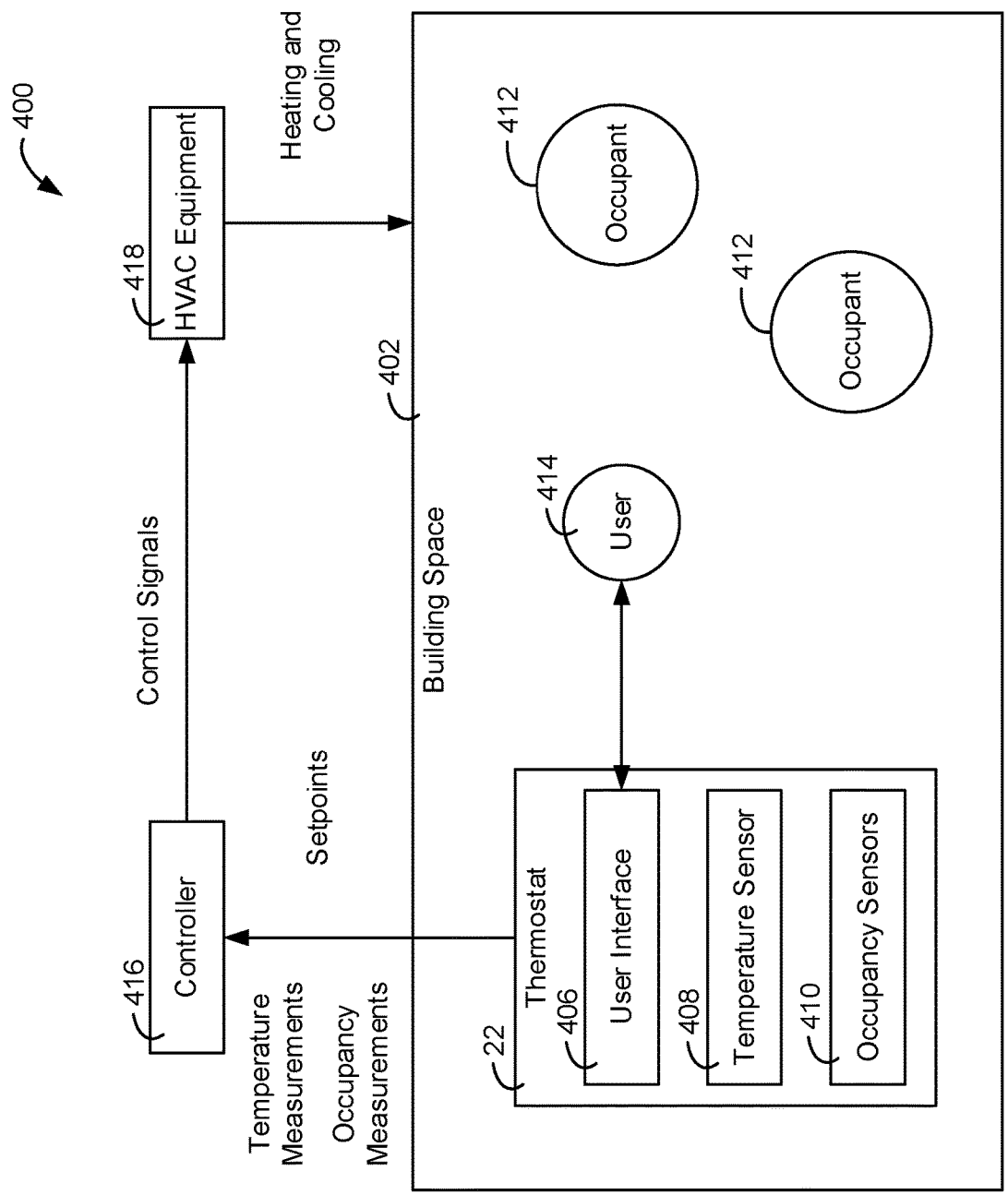
FIG. 4A is a block diagram of a system for controlling the temperature of a building space using the thermostat of FIG. 2B, according to an example embodiment.

Referring now to FIG. 4A, a system 400 for monitoring and controlling the temperature of a building space 402 is shown, according to an example embodiment. System 400 is shown to include a thermostat 22 installed within a building space 402. In the example shown, the building space 402 includes a single thermostat 22. Thermostat 22 is shown to include a user interface 406, a temperature sensor 408, and an occupancy sensor 410. User interface 406 includes an electronic display for presenting information to a user 414 and one or more physical input devices (e.g., a rotary knob, pushbuttons, manually-operable switches, etc.) for receiving input from a user 414. Temperature sensor 408 measures the temperature of building space 402 and provides the measured temperature to user interface 406.

The occupancy sensors 410 are configured to measure various indicators of the occupancy level (e.g., the number of occupants 412) within the building space 402. One such sensor may include a gas sensor. The gas sensor may include a nondispersive infrared (NDIR) carbon dioxide sensor including an air intake, air outtake, with a volume between the air intake and the air outtake. A radiation source may radiate at a predetermined intensity through the volume. The amount of radiation absorbed by the air in the volume may be proportional to the concentration of carbon dioxide in the air. Thus, by measuring the intensity of the radiation transmitted from the source to a detector, the gas sensor may determine a concentration (e.g., in parts-per-million or "PPM") of carbon dioxide in the air. As will be described below, such concentration measurements may be used to both establish a baseline concentration level and to determine an occupancy level of the building space 402. A more detailed explanation of the occupancy sensors 410 will be provided below in relation to FIG. 4B.

The thermostat 22 communicates with a controller 416. In various embodiments, the controller 416 may be integrated with thermostat 22 or may exist as a separate controller (e.g., a field and equipment controller, a supervisory controller, etc.) that receives input from the thermostat 22. The thermostat 22 may send temperature measurements and temperature setpoints to the controller 416. In turn, the controller 416 generates control signals for HVAC equipment 418. In an example embodiment, the HVAC equipment 418 includes the HVAC system 42 discussed above in relation to FIG. 3. In such an embodiment, the control signals may cause control circuits 46 or 48 to control the operation of motors 50, 54, and 58 so as to change the amount of heating or cooling provided to the building space 402.

Figure 4B:
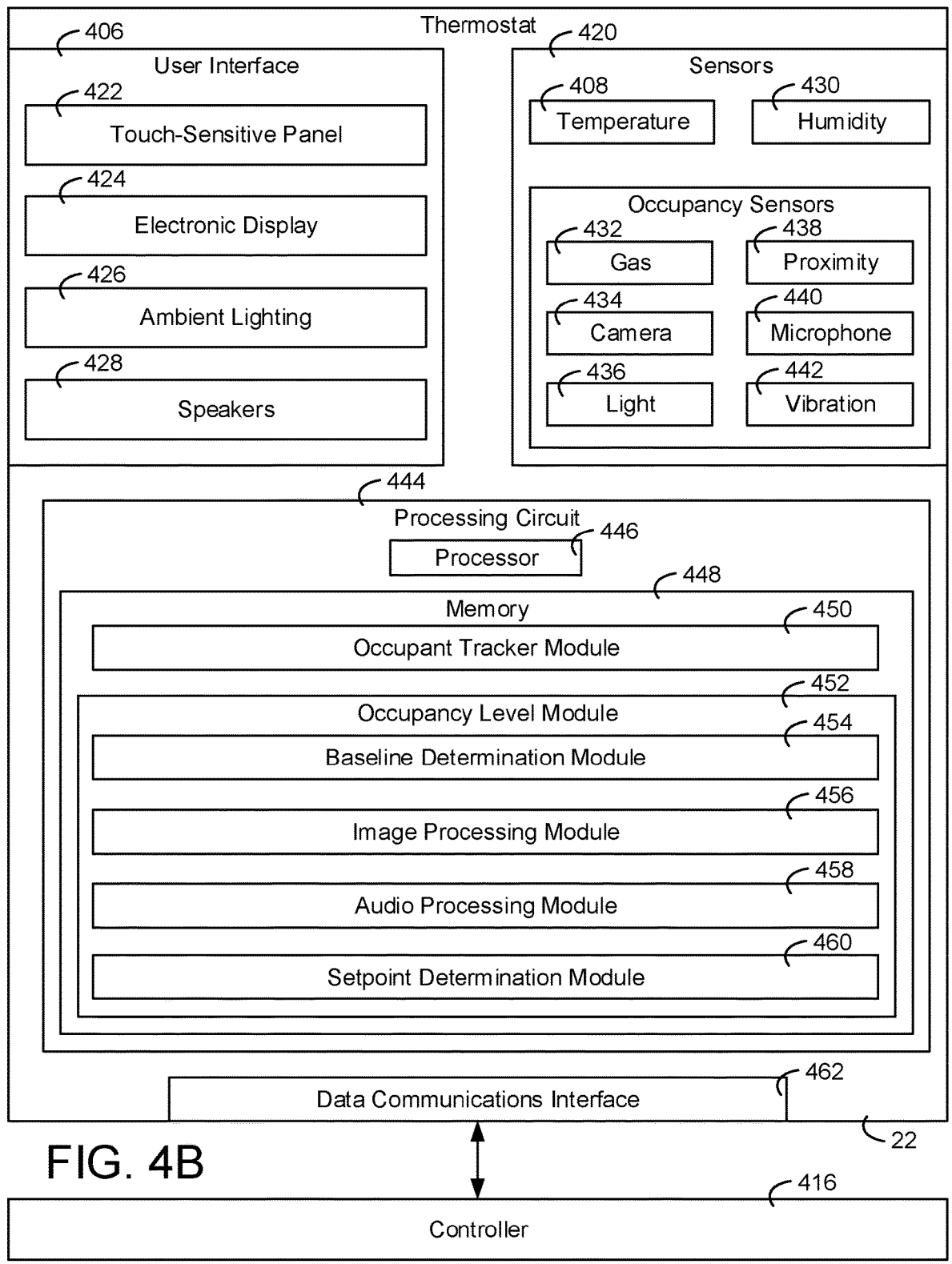
FIG. 4B is a block diagram of the thermostat of the system of FIG. 4A, according to an example embodiment.

Referring now to FIG. 4B a block diagram illustrating the thermostat 22 in greater detail is shown, according to some embodiments. Thermostat 22 is shown to include a variety of user interface devices 406 and sensors 420. User interface devices 406 may be configured to receive input from the user 414 and provide outputs to the user 414 in various forms. For example, user interface devices 406 are shown to include a touch-sensitive panel 422, electronic display 424, ambient lighting 426, and speakers 428. In some embodiments, user interface devices 406 include a microphone configured to receive voice commands from a user, a keyboard or buttons, switches, dials, or any other user-operable input devices. It is contemplated that user interface devices 406 may include any type of device configured to receive input from a user and/or provide an output to a user in any of a variety of forms (e.g., touch, text, video, graphics, audio, vibration, etc.).

Sensors 420 may be configured to measure a variable state or condition of the environment in which the thermostat 22 is installed (e.g., the building space 402). Sensors 420 may be integrated into the thermostat 22 or be remote from the thermostat 22 and communicate with the thermostat 22 (e.g., wirelessly via the data communications interface 462). In the example shown, the thermostat 22 includes the temperature sensor 408 and a humidity sensor 430 for measuring qualities of the air in the building space 402. In various other embodiments, the thermostat 22 may include various other sensors for measuring additional qualities of the air in the building space 402. For example, the thermostat 22 may also include an air quality sensor configured to detect the presence of various impurities in the air (e.g., nitrogen dioxide, carbon monoxide, etc.).

Additionally, the thermostat 22 includes a plurality of occupancy sensors 410. The occupancy sensors are configured to generate signals that are based at least in part on an indication of an occupant being in the building space 402. As discussed above, occupancy sensors 410 may include a gas sensor 432 that measures the concentration level of at least one human-generated gas in the air of the building space 402. In some embodiments, the thermostat 22 includes a plurality of gas sensors 432. For example, in addition to the carbon dioxide sensor discussed above, the thermostat may further include an oxygen sensor (e.g., an optical oxygen electrical sensor). Thus, the thermostat 22 may receive indicators of a carbon dioxide concentration level and an oxygen concentration level in the air. Using such indicators, baselines for both oxygen concentration levels as well as carbon dioxide concentration levels may be established for the building space 402 via the methods described herein.

The gases detected by the gas sensors 432 can include volatile organic compounds (VOCs) (e.g., methanol, isoprene, acetone, ethanol, and/or other alcohols), carbon dioxide ($CO_2$), nitrogen dioxide ($NO_2$), oxygen (O), etc. When humans breathe out, they may emit various gases indicative of the presence of the occupant. The occupancy detection via gases as described herein can use any type of gas as described herein.

Occupancy sensors 410 further include a camera 434. Camera 434 may capture digital still images and/or videos of the building space 402. The thermostat 22 may further include various image processing modules (e.g., the image processing module 456 described below) configured to analyze the image captured by the camera to determine if an occupant is present in the building space 402. Occupancy sensors 420 may further include a light sensor 436 (e.g., a photodiode) configured to generate a signal when certain wavelengths of light that are indicative of occupancy (e.g., lights emitted from displays of a user computing device) are detected, a proximity sensor 438, a microphone 440, and a vibration sensor 442. In some embodiments, the camera 434 is an infrared (IR) camera that captures a signal with each pixel representing an amount of thermostat energy associated with each pixel.

Still referring to FIG. 4B, thermostat 22 is shown to include a communications interface 462 and a processing circuit 444. Communications interface 462 may include wired or wireless interfaces (e.g., jacks, antennas, transmitters, receivers, transceivers, wire terminals, etc.) for conducting data communications with various systems, devices, or networks. For example, communications interface 462 may include an Ethernet card and port for sending and receiving data via an Ethernet-based communications network and/or a Wi-Fi transceiver for communicating via a wireless communications network. Communications interface 462 may be configured to communicate via local area networks or wide area networks (e.g., the Internet, a building WAN, etc.) and may use a variety of communications protocols (e.g., BACnet, IP, LON, etc.). Communications interface 462 may include a network interface configured to facilitate electronic data communications between the thermostat 22 and various external systems or devices (e.g., the controller 416 and/or HVAC equipment 418).

Processing circuit 444 is shown to include a processor 446 and memory 448. Processor 446 may be a general purpose or specific purpose processor, an application specific integrated circuit (ASIC), one or more field programmable gate arrays (FPGAs), a group of processing components, or other suitable processing components. Processor 446 may be configured to execute computer code or instructions stored in memory 448 or received from other computer readable media (e.g., CDROM, network storage, a remote server, etc.).

Memory 448 may include one or more devices (e.g., memory units, memory devices, storage devices, etc.) for storing data and/or computer code for completing and/or facilitating the various processes described in the present disclosure. Memory 448 may include random access memory (RAM), read-only memory (ROM), hard drive storage, temporary storage, non-volatile memory, flash memory, optical memory, or any other suitable memory for storing software objects and/or computer instructions. Memory 448 may include database components, object code components, script components, or any other type of information structure for supporting the various activities and information structures described in the present disclosure. Memory 448 may be communicably connected to processor 448 via processing circuit 444 and may include computer code for executing (e.g., by processor 446) one or more processes described herein. For example, memory 748 is shown to include an occupant tracker module 450 and an occupancy level module 452.

The occupant tracker module 450 is structured to cause the processor 446 to determine the location of various occupants of the building space 402. In some embodiments, the occupant tracker module 450 is configured to process signals produced by the occupancy sensors 410 to track the location of various occupants. For example, in response to the proximity sensor 438 detecting the presence of an occupant, the occupant tracker module 450 may identify the location of the occupant as being within a predetermined distance of the thermostat 22. Alternatively or additionally, the occupant tracker module 450 may also identify the location of various occupants using the camera 434 and/or microphone 440. For example, the occupant tracker module 450 may identify the location of various color contrasts in images captured by the camera 434 (e.g., to identify the location of a flesh color) to determine that an occupant is present. Additionally, the occupant tracker module 450 may further analyze the image data to determine the relative distance of the occupant from the thermostat 22. For example, such a determination may be made based on the size of a particular attribute of the identified occupant (e.g., the face). The occupant tracker module 450 may perform a similar analysis on sound data received from microphones 440. For example, an occupant may be identified based on the frequency composition of a sound received by the microphone 440, and a relative distance of the occupant from the thermostat 22 may be determined based on a sound pressure level measured by the microphone 440.

In some embodiments, in addition to detecting the location of occupants via the sensors 420, additional equipment may be used to track building occupants. For example, in some embodiments, the thermostat 22 is connected to an external network associated with the building space. A plurality of additional devices (e.g., mobile devices) associated with various occupants 412 of the building space may also be connected to the network. This external network may be generated through a plurality of routers associated with a building management system (not shown) associated with the building space. The routers may provide access points to the network. Such routers may engage in bi-directional communications with the devices and thermostat 22. For example, the routers may receive a connection request from a user device associated with the user 414 including login credentials, and transmit an encryption key or the like to the user device to establish a secure connection with the user device. Through such a connection, the user device may communicate with a remote server of the building management system to receive webpages from the building management containing various forms of information pertaining to various aspects of the building (e.g., the HVAC system 42, sensor values measured by sensors 420, etc.). Similar procedures may be followed for other devices associated with occupants 412.

The routers may measure the strength of the wireless signals received from the user devices. The signal strengths may be communicated by the routers to the thermostat 22 which, by the occupant tracker module 450, may determine the location of a specific device (and therefor an associated occupant 412) based on the strength of the signals and location information pertaining to the routers stored on the thermostat 22. Accordingly, the precise location for each occupant 412 in the building having such a device may be measured.

Figure 4C:
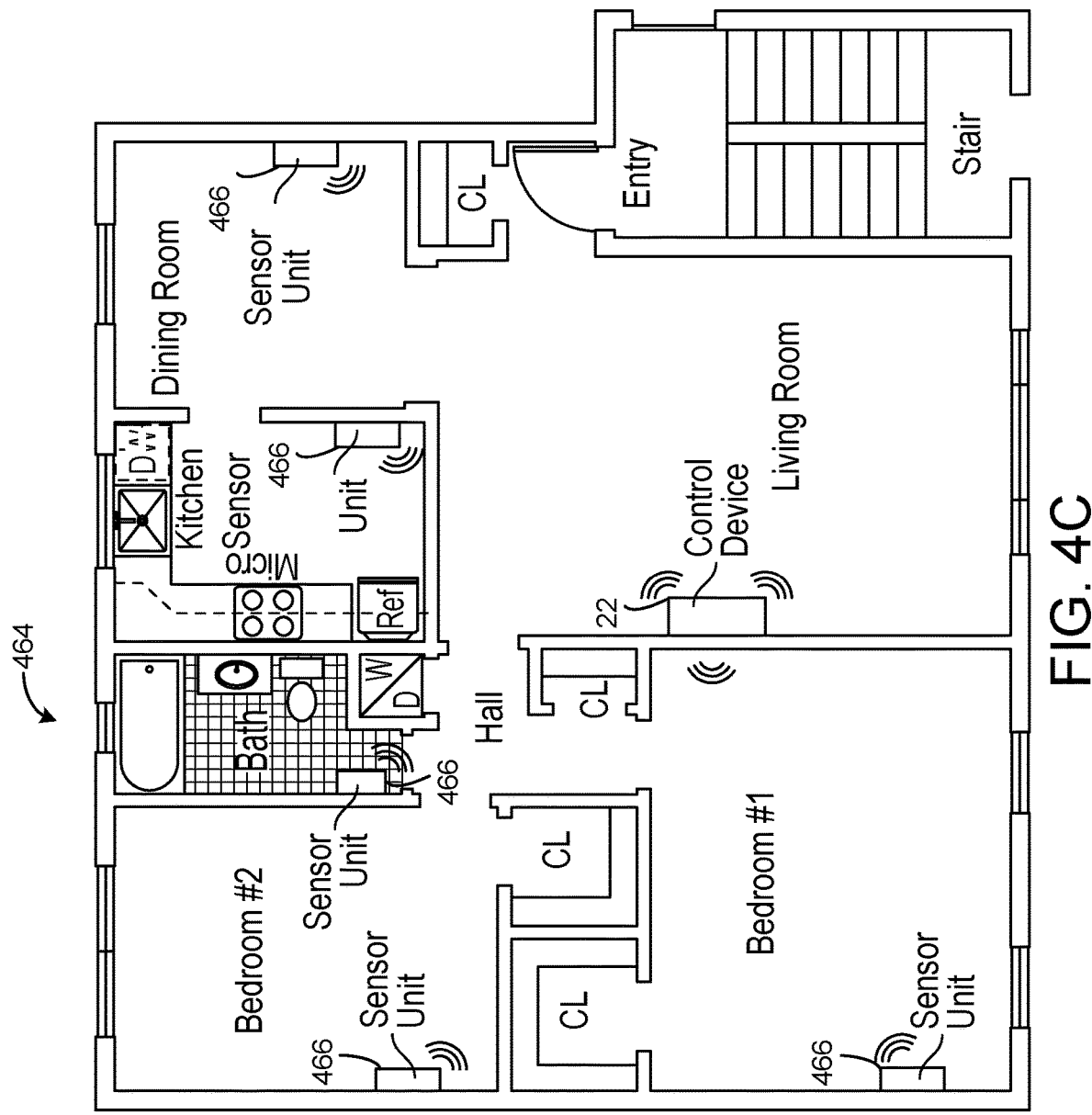
FIG. 4C is a block diagram of a floorplan for a building space, according to an example embodiment.

In some embodiments, the building space 402 may include a plurality of sets of sensors 420 to precisely measure the location of various building occupants. Referring quickly to FIG. 4C, a floorplan 464 of a building space is shown, according to an example embodiment. The building space is shown to include several different zones (e.g., rooms or areas) including a living room, a first bedroom, a second bedroom, a bathroom, a kitchen, and a dining room. A sensor unit 466 including the set of sensors 420 discussed above may be installed in each one of the rooms or zones. One zone may include a main control unit. For example, FIG. 4C shows a main control unit (e.g., thermostat 22) installed in the living room. The main control unit may serve as a central hub for monitoring environmental conditions, controlling various devices throughout the home, and/or tracking occupancy through multiple rooms and/or zones of the home.

Sensor units 466 including any combination of the sensors 420 discussed above may be installed in various rooms or zones in the home. For example, FIG. 4C shows a sensor unit installed in each of the bedrooms, the bathroom, the kitchen, and the dining room. In some embodiments, the sensor units 466 measure signals strengths between user devices similar to the routers discussed above. In various embodiments, sensor units 466 are configured to relay image data, audio data, gas concentration data, or other data to thermostat 22 (e.g., by the external network discussed above). Thermostat 22 may locate the occupants and identify occupancy levels of various zones of the building based on the received signals. For example, each sensor unit 466 may have an associated identifier stored at the thermostat 22. Thus, based on various sensor signal values and the identifier, the thermostat 22 may determine a precise location for various occupants within the building. Using such locations, the thermostat 22 may control the heating and/or cooling provided to each of the zones. For example, each room or zone may include a separate air handling unit (e.g., as discussed above with respect to FIG. 1), and thermostat may provide control signals to control the amount of warm or cool air provided to each one of the zones via the methods disclosed herein.

Turning back now to FIG. 4B, the memory 448 is shown to further include an occupancy level module 452. The occupancy level module 452 is structured to cause the processor 446 to analyze various forms of data received by the thermostat 22 to determine an occupational level of a building or zone thereof. In the example embodiment shown, the occupancy level module 452 includes a concentration level tracking module 454, an image processing module 456, an audio processing module 458, and a setpoint determination module 460. It should be appreciated that, while the modules 454-460 are illustrated as being separate from one another, the memory 448 may include a different number of modules performing the same functions as the modules 454-460. For example, a single module may perform each of the functions discussed below with respect to the modules 454-460.

The baseline determination module 454 is configured to determine a baseline concentration level for various gases detected by the gas sensors 432. For example, the baseline determination module 454 may keep a global average of carbon dioxide concentration levels in the building space 402. The global average may include a weighted average of all the concentration level values measured by the gas sensors 432. Values closer to an established baseline of the building space 402, for example, may receive greater weight than values further from the established baseline. In some embodiments, the baseline determination module 454 may continuously update the global average value (e.g., daily, weekly, monthly, etc.).

In some embodiments, baseline determination module 454 is configured to determine circumstantial concentration baselines. Circumstantial baselines may include baselines for various levels of occupancy in the building space 402. One such circumstantial concentration baseline may include a no-occupancy carbon dioxide concentration level baseline. Thus, the baseline determination module 454 is configured to identify various time periods in which there are no occupants in the building space 402, and keep an average of the carbon dioxide concentration levels measured by the gas sensor 432 during those times. In some embodiments, the baseline determination module 454 is configured to identify periods of no occupancy based solely on carbon dioxide concentration levels. When at least one occupant is within the building space 402 for a prolonged period, the carbon dioxide concentration within the air of the building space will generally be slightly higher than when there are no occupants in the building space for a prolonged period.

Assuming that there are minimal other sources of carbon dioxide production in the building space, if an occupant leaves the building space 402, the carbon dioxide concentration will slowly decline to a steady state no-occupancy value. Accordingly, the baseline determination module 454 is configured to monitor the concentration values returned by the gas sensor 432 for steady state local minimums. For example, if successive readings over the course of a predetermined period are within a predetermined range of one another and average to a value that is lower than a previously-determined steady state average, the baseline determination module 454 may identify that steady state average as no-occupancy value. A plurality of such values may be averaged together to establish the no-occupancy carbon dioxide concentration level baseline. As with the global averages discussed above, the baseline determination module 454 may continuously update the baseline value.

Similar baselines may be established for other occupancy ranges. For example, the baseline determination module 454 may receive occupancy estimates from the image and audio processing modules 454 and 456 at various times. The baseline determination module 454 may store concentration levels returned by the gas sensor 432 in association with the estimates provided based on the camera 434 and 434 and establish baselines via the methods described above. In some embodiments, the baseline determination module 454 compares the concentrations levels measured by the gas sensor 432 to these baselines to estimate the level of occupancy in the building space 402.

Alternatively or additionally, the baseline determination module 454 is also configured to identify local trends in the data captured by the gas sensor(s) 432. Such local trends may also reveal a heightened level of occupancy in the building space 402. For example, the rate of change of the concentration of carbon dioxide (or in any zone thereof) being above a predetermined rate threshold may be indicative of a heightened level of occupancy even if the concentration remains relatively close to the established baseline. It should be understood that in embodiments where the thermostat 22 receives data from multiple gas sensors 432 (e.g., carbon dioxide sensors being placed in different rooms), the baseline determination module 454 may perform a similar set of operations with respect to each sensor.

The image processing module 456 is configured process images captured by the camera 434 associated with the user thermostat 22 to further discern the level of occupancy in the building space 402. In this regard, the image processing module 456 includes image processing algorithms configured to identify various features in the images captured by the camera 434 or other cameras. For example, one image processing algorithm may search the images captured by the camera 434 for occupant signatures. An occupant signature may include any attribute that is typically associated with an occupant such as, but not limited to, a face, pair of arms, a movement pattern, a piece of clothing, or any combination thereof.

To illustrate, the image processing algorithm may scan an image captured by the camera 434 for flesh-colored groups of pixels. Based on various groupings of flesh-colored pixels, the image processing algorithm may generate an occupancy level estimate (e.g., based on the number of heads or faces that were located). In another example, the image processing module 456 may assess a series of images captured by the camera 434 to estimate the occupancy level of the building space 402. For example, motion detection software may identify objects that move from frame to frame in the successive images. The algorithm may estimate the occupancy level based on the number of detected objects meeting human-identifying parameters (e.g., defining the sizes of various human attributes) that moved.

The audio processing module 458 is configured to process audio signals captured by the microphone 440 or any other microphones located throughout the building space 402 to further discern the level of occupancy in the building space 402. For example, the audio processing module 458 may include a series of predetermined audio signatures thereon. The audio signatures may be associated with a plurality of regular occupants of the building space 402. For example, the audio processing module 458 may include a data logger that stores various segments of captured audio signals. Each segment may be associated with a different regular occupant based on various aspects of the sound described by the signal (e.g., frequency band composition, pressure levels, texture, etc.). The segments may be stored at the user thermostat 22 or in a remote server of the building management 610. Such segments may be captured during an initiation process of the thermostat 22. Alternatively, the audio processing module 458 may determine that a particular occupant is "regular" if similar audio signals are captured on successive days, for example. In any event, each time the microphone 440 picks up a segment of speech, various comparisons may be run to determine if the speech was emitted by a regular occupant. If an irregular signature is detected, this may be a sign that the owner of the building space 402 is having company over, and therefore a sign of heightened occupancy.

Alternatively or additionally, the audio processing module 458 may identify period of heightened occupancy based on the combination of sound signals being received by the microphone 440. In a crowded room, many occupants having different voices may emit sounds at once. Thus, by decomposing the received signal from the microphone 440 into the frequency various frequency bins (e.g., via the Fast Fourier Transform algorithm) and applying various filtering modules (e.g., noise gates) the audio processing module 458 may estimate the number of occupants based on various frequency band groupings in the received signal.

In various embodiments, the occupancy level module 452 may use multiple modes for estimating the occupancy to verify occupancy level estimates. For example, the occupancy level module 452 may obtain a first estimate for the occupancy level based on the carbon dioxide concentration, a second estimate based on images captured by the camera 434, and a third based on sound signals captured by the microphone 440. In one embodiment, the occupancy level module 452 uses the estimate given by the baseline determination module 454 as a primary estimate for occupancy level, and uses the image processing module 456 and/or the audio processing module 458 to verify the estimation given by the baseline determination module 454. In other words, if the estimate given by either the image processing module 456 or the audio processing module 458 is within a predetermined threshold of the estimate given by the baseline determination module 454, the occupancy level module 452 uses that as an estimate for the current state of occupancy for the building space 402. In some embodiments, the occupancy level module 452 only provides an estimate of the occupancy of building space 402 if each of the estimates given by the baseline determination module 454, image processing module 456, and audio processing module 458 fall within a predetermined range of one another.

Setpoint determination module 460 is configured to adjust environmental setpoints based on the occupation level estimates provided by the baseline determination module 454, image processing module 456, and audio processing module 458. As discussed above, a user may provide environmental setpoint inputs to the thermostat 22 via the user interface 406. Environmental setpoint inputs may indicate user preferences as to the temperature, humidity, and concentration levels (e.g., carbon dioxide concentration levels) of the building space 402. Once such inputs are provided via the thermostat 22, the environmental conditions of the building space 402 are monitored via 420 which provide control signals to the HVAC equipment 418 (e.g., the controller 416) to maintain the air conditions in the building space 402 at the setpoints. For example, if the temperature sensor 408 measures that the temperature in the building space 402 is above a setpoint temperature, the controller 416 may control the motors 50, 54, and 58 to increase the amount of cool air provided to the building space 402.

During times of increased occupancy (e.g., multiple guests enter the building space 402), the environmental conditions in the building space 402 quickly start to deviate from the user-input environmental setpoints. People continuously give off heat. Thus, assuming the air in the building space 402 was at the user-input setpoint prior to the heightened occupancy, the building space 402 will begin rise above the setpoint once the additional occupants arrive. While the temperature sensor 408 will eventually detect such a deviation and provide control signals to the HVAC system 42 to counteract the increase, such a response is often delayed, as it takes time for the temperature of the building space 402 to appreciably rise. During this delay, the heightened occupancy have other undesired consequences on the air in the building space 402. For example, a great number of occupants in a building may increase water vapor levels, making the building space 402 feel stuffy.

To counteract these undesired effects, the systems and methods disclosed herein use the occupancy level estimates generated by the methods discussed above to modify the setpoints from those that were set by the user. For example, the camera 434 may capture images of the building space 402, and the thermostat 22 (e.g., by the processor 446 executing the image processing module 456) may estimate the level of occupancy immediately after the occupants enter the building zone. This allows the HVAC system 42 to anticipate the above-described undesired changes.

In this regard, the thermostat 22 executes the setpoint determination module 460 once building occupancy is estimated so as to pre-emptively control the HVAC equipment 418. As such, in one embodiment, the setpoint determination module 460 receives user-input environmental setpoints and estimated occupancy level as inputs and computes adjustments to the setpoints based on the estimated occupancy level. The adjustments may be computed based on a plurality of additional factors. For example, the adjustments may be further based on a baseline level of occupancy in the building space 402. In such an embodiment, is presumed that the user-input setpoints were provided with the baseline level of occupancy in mind. Thus, adjustments may only be made if the current occupancy level of the building space 402 deviates from the baseline level of occupancy by more than a predetermined threshold. Accordingly, the setpoint determination module 460 may compare the occupancy level estimated via the methods described above with a baseline occupancy level. Methods for computing such a baseline are described below with respect to FIG. 10. If the estimated occupancy level deviates from the baseline by more than a predetermined threshold, the setpoint determination module 460 computes a lowering-amount for the user-input setpoints. As a result, the HVAC equipment 418 will immediately provide lower temperature air to the building space 402 to counteract the above-mentioned unpleasant effects caused by the heightened occupancy.

Setpoint determination module 460 may include a number of lookup tables. Each lookup table may be associated with a user-input setpoint range. For example, one lookup table may be associated with a user-input temperature setpoint between 65 and 67 degrees Fahrenheit, another lookup table may be associated with a user-input temperature setpoint between 67 and 69 degrees Fahrenheit, and so on. Each lookup table may include a plurality of entries, with each entry including an estimated occupancy level and an adjustment amount. Thus, upon the baseline determination module 454, image processing module 456, and/or audio processing module 458 providing an occupancy level estimate, the setpoint determination module 460 retrieves a user-input setpoint, and identifies an adjustment amount based on the user-input setpoint and the occupancy level estimate. The adjustment amounts may be determined by the manufacturer of the thermostat 22 or be pre-calibrated upon installation of the thermostat 22 at the building space 402. For example, in one embodiment, the adjustment amounts are based on the performance of the HVAC equipment 418. HVAC equipment 418 may have the capability of changing the temperature inside the building space 402 from a first temperature (i.e. setpoint) to a second temperature at a particular rate that depends on the temperatures involved. Thus, the setpoint adjustment may be chosen such that the HVAC equipment 418 counteracts the rate of temperature increase in the building space 402 caused by heightened levels of occupancy. Such rates may be determined based on the size of the building space 402.

In some embodiments, various alterations may be made to the adjustment based on various other factors. For example, weather conditions received from a weather serve may be taken into account. To illustrate, the adjustment to the user-input setpoint may be enhanced (i.e., so as to further decrease the setpoint in response to a heightened occupancy) if an indication is received from the weather server that it is very warm (e.g., above 80 degrees Fahrenheit) outside the building space 402. In another example, adjustments may be diminished if an indication is received that it is very windy outside the building.

In some embodiments, the setpoint determination module 460 may transmit a heightened occupancy alert via the above described external network to a user device in response to an estimate of heightened occupancy. The alert may enable the user to provide an input as to a user-preference for a setpoint adjustment. As such, the user may pre-emptively adjust the operation of the HVAC equipment 418 in accordance with the user's preferences.

In various embodiments, setpoint determination module 460 may adjust various other operational aspects of HVAC equipment 418. For example, in addition to adjusting the temperature of the air flowing into the building space 402 from a supply air duct, the setpoint determination module 460 may also compute adjustments to various ventilation rates of the HVAC equipment. For instance, setpoint determination module 460 may receive signals from various dampers disposed throughout the building space that indicate the position of the dampers, and the setpoint determination module 460 may compute adjustments to the dampers based on the occupancy estimates.

In some embodiments, the functionality of the thermostat 22 is implemented in a smart ventilator. The smart ventilator may include the gas sensor 432 and can be configured to operate itself in order to ventilate a building based on air quality. For example, if, via the gas sensor 432, it is determined that the air quality is poor, the smart ventilator may operate to ventilate the building space 402 and improve the air quality of the building space 402. A building may include multiple smart ventilators, each configured to ventilate a particular area of a building. Since each of the smart ventilators may include a gas sensor 432 each smart ventilator can operate independently from each other. This causes only specific areas of the building to be ventilated as needed, realizing an energy usage reduction.

Figure 5:
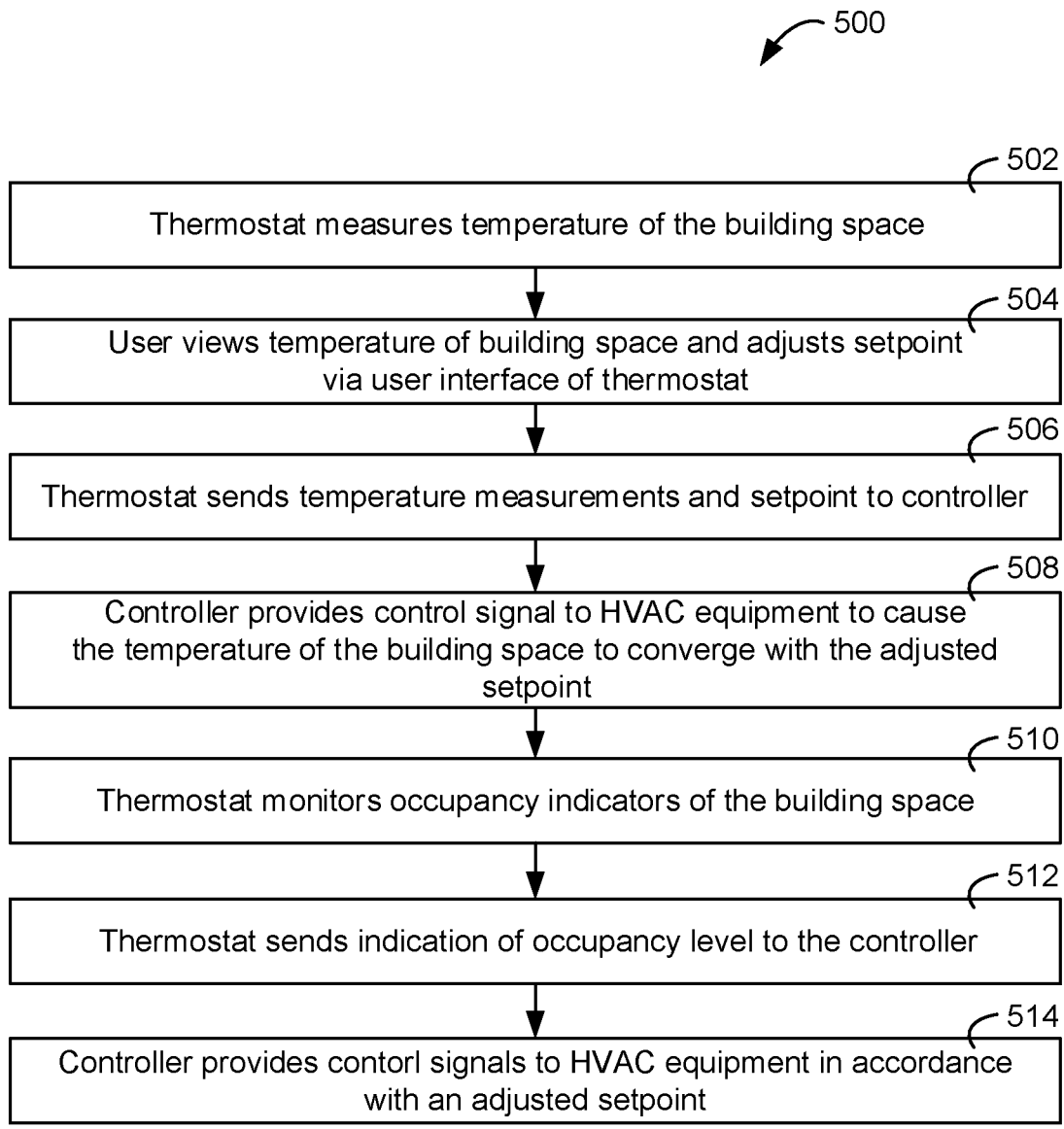
FIG. 5 is a flowchart of a process for controlling the temperature of a building space using the thermostat of FIG. 2A, according to an example embodiment.

Referring now to FIG. 5, a process 500 for monitoring and controlling the temperature of a building space is shown, according to some embodiments. Process 500 may be performed by the system 400, as described with reference to FIGS. 4A-4B. In process 500, thermostat 22 measures the temperature of the building space (step 502). User 414 views the measured temperature and adjusts the temperature setpoint via user interface 406 of thermostat 22 (step 504). Thermostat 22 sends the measured temperature and the setpoint to the controller 416 (step 506). Controller 416 uses the measured temperature and the setpoint to generate and provide a control signal to HVAC equipment 418 to cause the temperature of the building space 402 to converge with the user-input setpoint (step 508).

As steps 502-508 of the processor are performed, the thermostat 22 monitors various indicators of occupancy in the building space (step 510). Occupancy sensors 410 of the thermostat 22 may measure any aspect of the environment of the building space 402 that bears any sort of relationship to the occupancy level of the building space 402. For example, gas sensors 432 may monitor a carbon dioxide concentration level in the building space 402, or a camera 434 may take an image of the building space 402.

Based on the indicators monitored at step 510, the thermostat 22 estimates the level of occupancy in the building space and sends an in indication of the occupancy level to the controller 416 (step 512). For example, the thermostat 22 may compare a concentration level estimate generated based on a signal from the gas sensor 432 (e.g., via the baseline determination module 454) by comparing the sensor level to various baselines. If the concentration level is above a baseline, the thermostat may provide an indication of heightened occupancy to the controller 416. Such an indication may include adjusted environmental setpoints (e.g., determined by the setpoint determination module 460).

In response to the heightened occupancy indication, the controller 416 provides control signals to the HVAC equipment 418 to cause the temperature of the building space 402 to converge with the adjusted setpoint (step 514). As such, the more cool air is supplied to the building so as to counteract the negative effects of heightened occupancy on air quality.

Figure 6:
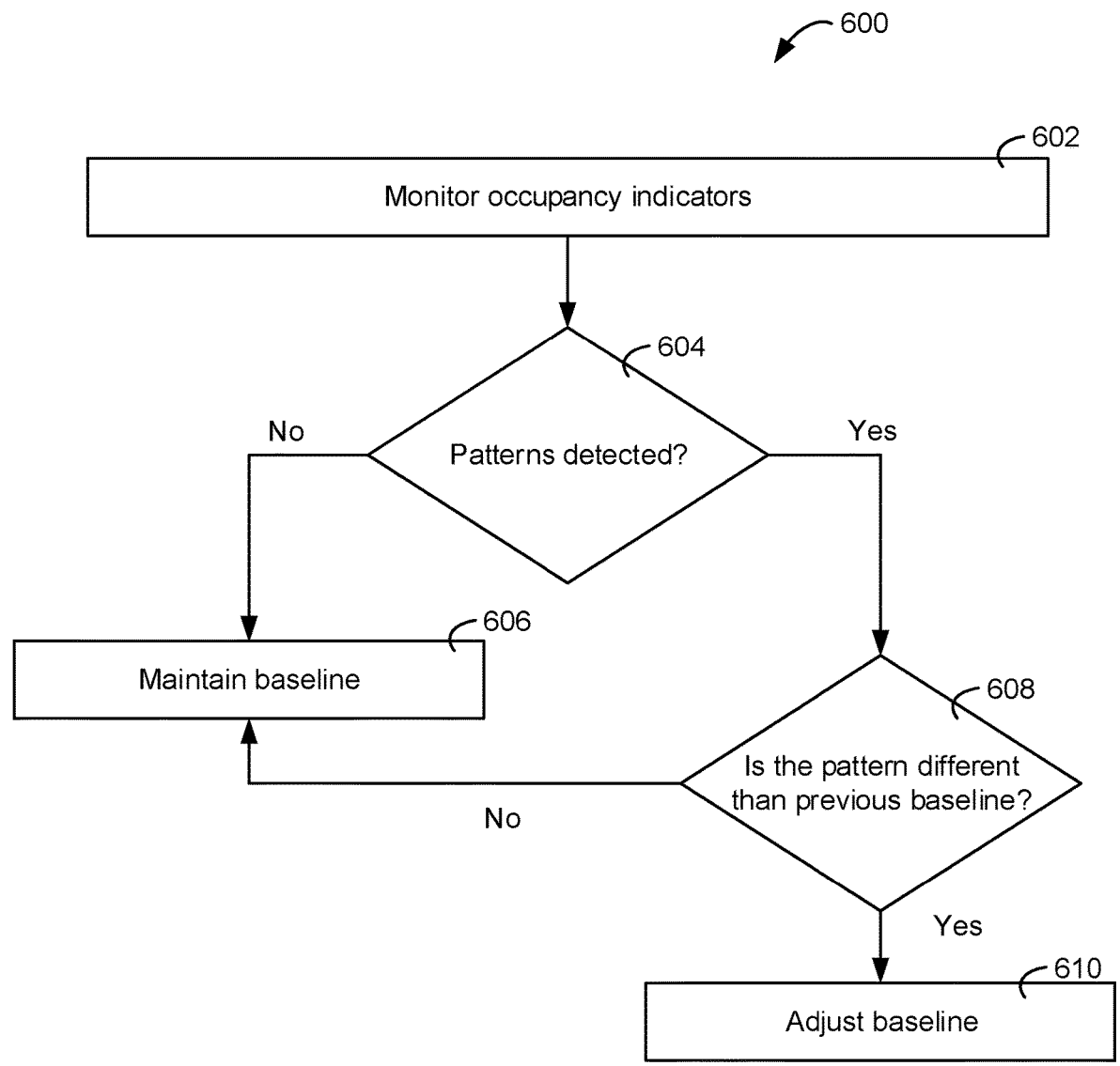
FIG. 6 is a flowchart of a process for measuring the baseline of an occupancy indicator, according to an example embodiment.

Referring now to FIG. 6, a flowchart illustrating a baseline updating process 600 performed by the occupancy level module 452 of the thermostat 22 as described with reference to FIG. 4 is shown, according to an example embodiment. Through the process 600 illustrated by FIG. 6, the thermostat 22 continuously updates occupancy level benchmarks of the building space 402 such that pre-emptive adjustments to the HVAC equipment 418 only occurs when the level building occupancy significantly deviates from normal. As such, over-adjustment against user preferences is avoided.

In some embodiments, the thermostat 22 is configured to monitor various occupancy indicators (step 602). For example, the gas sensors 432 may continuously provide signals indicative of the concentration levels of various gases in the air inside of the building space 402. Additionally, the microphone 440 may continuously provide signals indicative of received sound signals meeting predetermined criteria (e.g., the microphone 440 may only provide signals to the occupancy level module 452 if sound signals captured largely resemble speech). Additionally, the camera 434 may periodically (e.g., every five minutes) capture an image of a zone of the building space 402. As such data is received, the occupancy level module 452 may transmit such data over a network to a remote server associated with the building for storage in association with the time when the data was captured.

After data captured by various sensors 420 is stored, the data is assessed for patterns (step 604). For example, the baseline determination module 454 may identify regular periods of heightened occupancy based on a pattern of heightened carbon dioxide concentration levels at particular times. If no patterns are detected from the received occupancy indicators, a previous occupancy baseline is maintained (step 606). The previous baseline may be a previous average carbon dioxide concentration level, for example. In some embodiments, the average is a rolling weighted average over a predetermined period (e.g., weekly, bi-daily, etc.). For example, each measurement captured by the gas sensor 432 may receive a weight based on its statistical relationship to a common range of concentration levels. Concentration values within the predetermined range may receive greater weights than values outside of the range. The baseline determination module 454 may include a plurality of such baselines, with each baseline corresponding to a different time interval. For example, a rolling average may be maintained for each hour over the course of a day.

If, however, patterns are detected in the occupancy indicators captured at 602, the detected pattern is compared with a previously-established baseline value (step 608). For example, the occupancy indicators received at 602 may indicate a heightened level of occupancy during a specific time interval (e.g., Friday evenings). In response to such an indication, a baseline concentration value for that time interval is retrieved and compared with the measured value. If the difference between the measured value and the established baseline for that time interval is not above a threshold, the previously-established baseline is maintained (step 606).

However, if the measured concentration value does differ from the established baseline value, the baseline is adjusted (step 610). In some embodiments, the adjusted baseline is the average of the indicators received at step 602 (e.g., if a heightened carbon dioxide level is detected over the course of a specific time interval on successive weeks, the average of the detected levels may be established as the new baseline). As such, baseline occupancy levels are constantly updated by the thermostat 22 to avoid over-adjustment of environmental setpoints. In some embodiments, if a pattern is detected, an alert is transmitted to the user device or provided by way of the electronic display 424 of the thermostat 22. The alert may indicate a pattern of heightened occupancy, and enable the user to establish a setpoint specifically for the time-interval of regular heightened occupancy.

Figure 7:
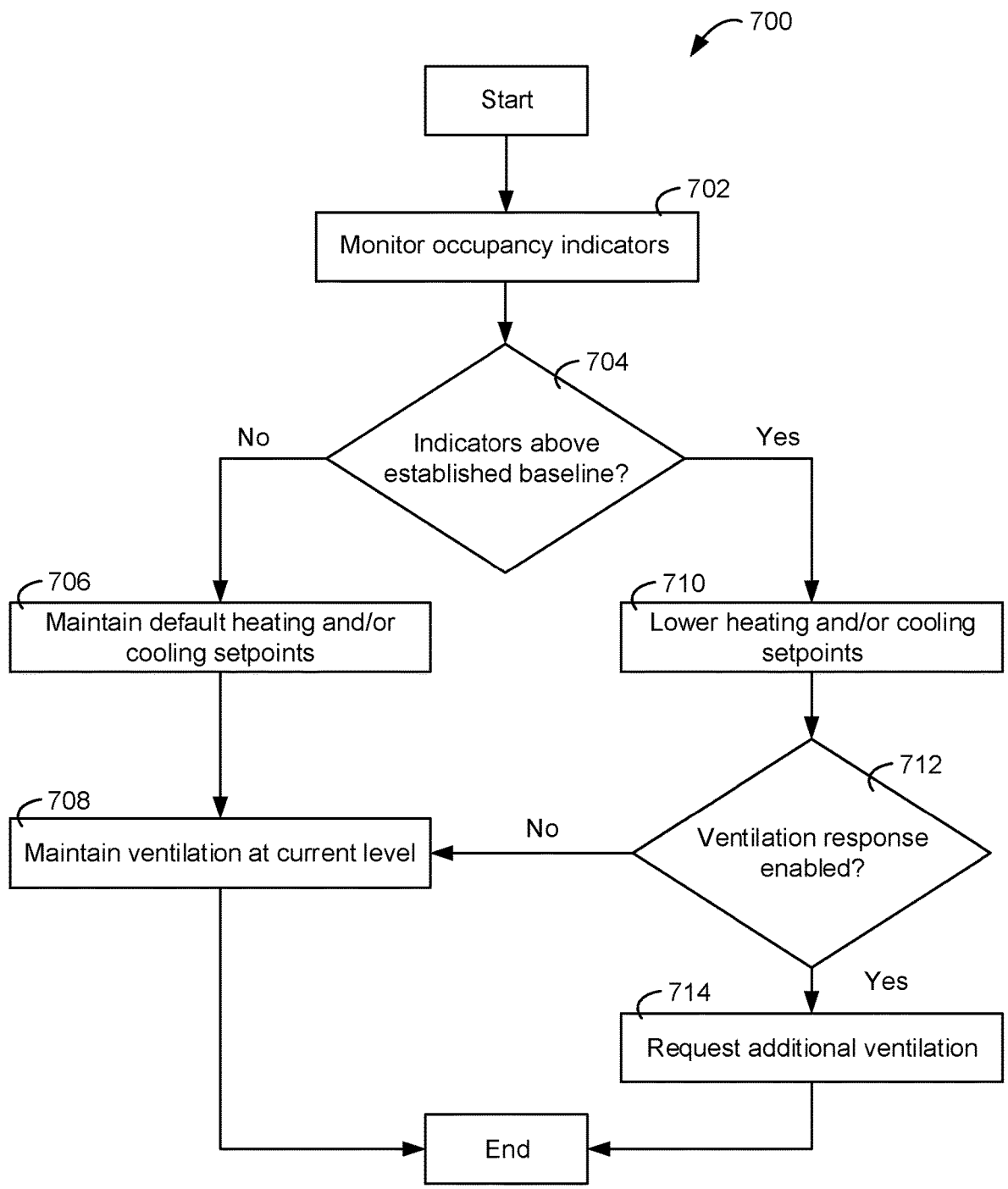
FIG. 7 is a flowchart of a process for adjusting environmental setpoints of an HVAC system, according to an example embodiment.

Referring now to FIG. 7, a flowchart 700 illustrating a process of controlling an HVAC system based on an occupancy proxy is shown, according to an example embodiment. The process may be performed by the occupancy level module 452 of the thermostat 22 as described with reference to FIG. 4. Through the process illustrated by the flowchart 700, the thermostat 22 may pre-emptively change the operation of an HVAC system in response to receiving an indication of heightened occupancy. As a result, comfortable air conditions are maintained.

In some embodiments, the thermostat 22 is configured to monitor various occupancy indicators (step 702). For example, the gas sensors 432 may continuously provide signals indicative of the concentration levels of various gases in the air inside of the building space 402. Additionally, the microphone 440 may continuously provide signals indicative of received sound signals meeting predetermined criteria (e.g., the microphone 440 may only provide signals to the audio processing module 458 if sound signals captured largely resemble speech). Additionally, the camera 434 may periodically (e.g., every five minutes) capture an image of a zone of the building space 402.

In some embodiments, various operations may be performed on the received data to estimate a level of occupancy in the building space 402. For example, a concentration of carbon dioxide measured by a gas sensor 432 may be converted to an occupancy level estimate using a lookup table in the baseline determination module 454, or by comparing the level to various baselines. Images captured by the camera 434 may be processed to search for occupant-specific features (e.g., movement patterns, edge shapes, etc.). A frequency analysis may be performed on any sound signals generated by the microphone 440 to estimate a number of occupants.

After occupancy indicators are received, the thermostat 22 is configured to determine if the received indicators are above established baseline levels (step 704). For example, the thermostat 22 may perform the process 600 discussed above in relation to FIG. 6 to determine baseline levels for various occupancy level indicators at various times. Accordingly, via the occupancy level module 452, the thermostat 22 may compare the indicators received at 702 to the established baselines. For example, if the gas sensor 432 measures a concentration level of carbon dioxide at a particular time, the thermostat 22 may retrieve a baseline carbon dioxide concentration level for that time, and compare the measured value to the retrieved value. In another example, various aspects of a sound signal generated by the microphone 440 (e.g., pressure levels, frequency compositions, etc.) may be compared to a baseline sound signal.

In some embodiments, rather than comparing the raw value of an indicator (e.g., a gas concentration level or a sound signal) with a stored baseline indicator, the thermostat 22 may compare occupation level estimates calculated based on the indicators to baseline occupation levels. For example, an image captured by the camera 434 may be processed by any of the methods disclosed herein to generate an estimate of the occupancy level. The estimate of the occupancy level may then be compared to a baseline occupancy level established by the method 600 discussed above.

In some embodiments, rather than determining if occupancy in the building space 402 has increased by more than a threshold, the thermostat 22 is also configured to determine the rate at which occupancy in the building has increased. For example, the thermostat 22 may compare an occupancy level estimate based on the most recent indicators received at 702 to estimates based on a previous set of indicators (e.g., a set of indicators received a quarter hour previous). Thus, in such embodiments, the thermostat 22 responds to a rate of increase in the occupancy level rather than just the absolute level of occupancy in the building space 402.

If occupancy indicator(s) received at 702 do not differ from an established baseline by more than a threshold, the thermostat 22 maintains the HVAC equipment 418 at its default heating and/or cooling setpoints (step 706). For example, via the user interface 702 discussed above, a user may establish default temperature setpoints for the building space 402 at various times. In the event that the occupation level in the building space 402 is at or below normal, these setpoints should be sufficient to maintain the inside of the building space 402 at a user-preferred temperature level.

In some embodiments, the baseline may be a predefined rate and an occupancy signal and/or occupancy signals can be used to determine a rate and compared to the predefined rate. For example, the thermostat 22 can record multiple gas concentration levels and determine a rate at which the gas is changing. If the gas is changing at a rate greater than the predefined rate, this may indicate heightened occupancy, i.e., the occupancy has increased. Similarly, if an audio signal is increasing at a rate greater than the predefined rate, this may also indicate that the occupancy is heightened.

However, if the indicators received at 702 differ from an established baseline, the thermostat 22 is configured to lower the heating and/or cooling setpoints from the user-default setpoints discussed above (step 710). A heightened level of occupancy results in a temperature increase in the building space 402 and an increased load on the HVAC equipment 418. Given this, the HVAC equipment 418 will be sluggish to counteract any temperature increased caused by the heightened occupancy level. As a result, the temperature in the building space 402 will generally be greater than the user prefers in times of occupancy. To counteract this, the thermostat 22 (e.g., via the setpoint determination module 460 discussed above) transmit control signals to the controller 416 based on adjusted setpoints. As discussed above, the amount that the setpoints are adjusted may depend on a plurality of factors such as the absolute number of occupants in the building estimated based on the indicators received at 702, the level of the user-input setpoints, the weather outside of the building space 402, and the particular zone within the building space 402 having the heightened occupancy (e.g., if the zone of heightened occupancy is a small room, the adjustment may be greater than if the zone is a large room).

In operation, the lowering of the setpoints causes the thermostat 22 to pre-emptively counteract the negative impacts on air quality caused by heightened levels of occupancy. For example, when a period heightened level of occupancy inside the building space 402 first begins, the temperature in the building space 402 may be at or near a user-input default setpoint. Thus, lowering the setpoint causes the temperature sensor 408 to detect a difference between the setpoint temperature and the temperature inside the building space 402. Such a difference causes the thermostat 22 to generate and transmit control signals to the HVAC equipment 418 that cause the HVAC equipment 418 to provide cooler air to the inside of the building space 402.

The thermostat 22 may also be configured to determine if a ventilation response to a heightened level of occupancy is enabled (step 712). In some embodiments, the thermostat 22 may be utilized in conjunction with HVAC equipment 418 lacking ventilation capabilities, or the user may indicate a preference for reduced ventilation (e.g., so as to save energy). In such cases, the control device maintains system ventilation at the current level (step 708). However, in systems where a ventilation response is enabled, the thermostat 22 requests additional ventilation from the HVAC equipment (step 714). For example, the thermostat 22 may transmit a control signal to actuators that control dampers in the outdoor unit 30 to cause the dampers to open. Thus more internal air in the building space 402 is ventilated to the exterior of the building, and the building space 402 is prevented from becoming stuffy.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for controlling a temperature of a building space, the controller comprising:
an occupancy gas sensor configured to measure an occupancy gas signal indicating whether one or more occupants are within the building space, wherein the occupancy gas signal indicates an occupant generated gas concentration level within the building space; and
a processing circuit configured to:
receive the occupancy gas signal from the occupancy gas sensor;
generate a gas signal baseline based on a plurality of samples of the occupancy gas signal collected by the controller during deployment of the controller in the building space by periodically updating the gas signal baseline as the plurality of samples of the occupancy gas signal are collected;
determine whether a number of occupants within the building space has increased by a predefined amount based on a comparison of the occupancy gas signal to the gas signal baseline;
preemptively cause a cooling call to be generated by decreasing a value of a temperature setpoint for the building space from a first value to a second value less than the temperature of the building space in response to a determination that the number of occupants within the building space has increased by the predefined amount based on the occupancy gas signal; and
reduce the temperature of the building space by controlling one or more pieces of building equipment associated with the building space based on the second value of the temperature setpoint in response to the cooling call being generated.

2. The controller of claim 1, further comprising a temperature sensor configured to measure the temperature associated with the building space, wherein the occupancy gas signal changes at a rate faster than the temperature changes at in response to the number of occupants within the building space changing by the predefined amount;
wherein the processing circuit is configured to reduce the temperature of the building space by controlling the one or more pieces of building equipment associated with the building space based on the second value of the temperature setpoint and the temperature of the building space.

3. The controller of claim 1, wherein the controller further comprises at least one of a camera configured to record one or more camera signals associated with the building space or a microphone configured to generate audio signals of the building space.

4. The controller of claim 1, wherein the processing circuit is configured to control a ventilator associated with the building space to increase a level of ventilation of the building space in response to the determination that the number of occupants within the building space has increased by the predefined amount based on the occupancy gas signal.

5. The controller of claim 1, further comprising a camera configured to capture a camera signal associated with the building space;
wherein the processing circuit is configured to:
receive the camera signal from the camera; and
determine whether the number of occupants within the building space has increased by the predefined amount by:
identifying the number of occupants within the building space based on the camera signal; and
comparing the number of occupants within the building space in the camera signal to a baseline occupancy level.

6. The controller of claim 1, further comprising a microphone configured to generate an audio signal indicative of sounds generated by occupants within the building space;
wherein the processing circuit is configured to:
receive the audio signal from the microphone; and
determine whether the number of occupants within the building space has increased by the predefined amount by:
identifying the number of occupants within the building space based on the audio signal; and
comparing the number of occupants to a baseline occupancy level.

7. The controller of claim 1, wherein the occupant generated gas concentration level is at least one of a carbon dioxide ($CO_2$) concentration level, a volatile organic compound (VOC) concentration level, and a nitrogen dioxide ($NO_2$) concentration level.

8. The controller of claim 1, wherein the processing circuit is configured to determine whether the number of occupants within the building space has increased by the predefined amount based on the occupant generated gas concentration level by:
determining a rate at which the occupant generated gas concentration level is increasing based on the occupant generated gas concentration level and one or more other occupant generated gas concentration levels; and
determining that the number of occupants within the building space has increased by the predefined amount in response to determining that the rate is greater than a predefined rate.

9. The controller of claim 1, wherein the processing circuit is configured to:
determine a plurality of baseline levels based on a plurality of additional occupant generated gas concentration levels and store the plurality of baseline levels in a memory device, each of the plurality of baseline levels being associated with a particular time interval; and
determine whether the number of occupants within the building space has increased by the predefined amount by:
retrieving one of the plurality of baseline levels from the memory device based on a time at which the occupant generated gas concentration level is received from the occupancy gas sensor; and
determine whether the number of occupants within the building space has increased by the predefined amount by comparing the occupant generated gas concentration level to the retrieved one of the plurality of baseline levels.

10. The controller of claim 9, wherein the processing circuit is configured to generate the one of the plurality of baseline levels based on the plurality of additional occupant generated gas concentration levels by performing a weighted average of the plurality of additional occupant generated gas concentration levels.

11. The controller of claim 1, wherein the processing circuit is configured to determine whether the number of occupants within the building space has increased by the predefined amount based on the occupant generated gas concentration level by comparing the occupant generated gas concentration level with a baseline.

12. The controller of claim 11, wherein the processing circuit is configured to:
receive a plurality of additional occupant generated gas concentration levels from the occupancy gas sensor, each of the plurality of additional occupant generated gas concentration levels indicating a particular gas concentration level at a particular time of a plurality of times; and
update the gas signal baseline based on the plurality of additional occupant generated gas concentration levels.

13. The controller of claim 1, wherein the processing circuit is configured to preemptively generate a ventilation call by increasing a ventilation level from a first level to a second level.

14. The controller of claim 1, wherein the processing circuit is configured to determine whether the number of occupants within the building space has increased by the predefined amount based on the occupancy gas signal based on a baseline value;
wherein the processing circuit is configured to generate the baseline value by:
determining a time associated with no occupancy;
receiving a plurality of values of the occupancy gas signal from the occupancy gas sensor associated with the time; and
generating the baseline value from the plurality of values.

15. A method for controlling a temperature of a building space, the method comprising:
receiving, by a processing circuit, an occupancy gas signal from an occupancy gas sensor, wherein the occupancy gas signal indicates an occupant generated gas concentration level within the building space, wherein the occupancy gas signal is a volatile organic compound (VOC) concentration level or a nitrogen dioxide (NO2) concentration level;
generating, by the processing circuit, a gas signal baseline based on a plurality of samples of the occupancy gas signal collected by the processing circuit during deployment of the processing circuit in the building space by periodically updating the gas signal baseline as the plurality of samples of the occupancy gas signal are collected;
determining, by the processing circuit, a number of occupants within the building space based on a comparison of the occupancy gas signal to the gas signal baseline;
determining, by the processing circuit, whether the number of occupants within the building space has increased by a predefined amount based on the occupancy gas signal;
preemptively causing, by the processing circuit, a cooling call to be generated by decreasing a value of a temperature setpoint for the building space from a first value to a second value less than the temperature of the building space in response to a determination that the number of occupants within the building space has increased by the predefined amount based on the occupancy gas signal; and
reducing, by the processing circuit, the temperature of the building space by controlling one or more pieces of building equipment associated with the building space based on the second value of the temperature setpoint in response to the cooling call being generated.

16. The method of claim 15, further comprising receiving, by the processing circuit, occupancy data from at least one of a camera configured to record one or more camera signals associated with the building space or a microphone configured to generate audio signals of the building space.

17. The method of claim 15, further comprising controlling, by the processing circuit, a ventilator associated with the building space to increase a level of ventilation of the building space in response to the determination that the number of occupants within the building space has increased by the predefined amount based on the occupancy gas signal.

18. The method of claim 15, wherein determining whether the number of occupants within the building space has increased by the predefined amount based on the occupant generated gas concentration level comprises:
determining a rate at which the occupant generated gas concentration level is increasing based on the occupant generated gas concentration level and one or more other occupant generated gas concentration levels; and
determining that the number of occupants within the building space has increased in response to determining that the rate is greater than a predefined rate.

19. A building control system for controlling a temperature of a building space, the building control system comprising:
a gas sensor configured to measure an occupant generated gas concentration level within the building space; and
a processing circuit configured to:
receive the occupant generated gas concentration level from the gas sensor;
generate a gas signal baseline based on a plurality of samples of the occupant generated gas concentration level collected by the building control system by periodically updating the gas signal baseline as the plurality of samples of the occupant generated gas concentration level are collected;
determine whether a number of occupants within the building space has increased by a predefined amount based on a comparison of the occupant generated gas concentration level to the gas signal baseline;
preemptively cause a cooling call to be generated by decreasing a value of a temperature setpoint for the building space from a first value to a second value in response to a determination that the number of occupants within the building space has increased by the predefined amount based on the occupant generated gas concentration level; and
reduce the temperature of the building space by controlling one or more pieces of building equipment associated with the building space based on the second value of the temperature setpoint in response to the cooling call being generated.

20. The building control system of claim 19, wherein the processing circuit is configured to determine whether the number of occupants within the building space has increased based on the occupant generated gas concentration level by:
determining a rate at which the occupant generated gas concentration level is increasing based on the occupant generated gas concentration level and one or more other occupant generated gas concentration levels; and
determining that the number of occupants within the building space has increased in response to determining that the rate is greater than a predefined rate.

* * * * *